United States Patent
Ikeda

(10) Patent No.: US 11,523,462 B2
(45) Date of Patent: Dec. 6, 2022

(54) COMMUNICATION APPARATUS CAPABLE OF WIRELESSLY COMMUNICATING WITH ANOTHER APPARATUS, CONTROL METHOD THEREFOR, AND STORAGE MEDIUM

(71) Applicant: CANON KABUSHIKI KAISHA, Tokyo (JP)

(72) Inventor: Kaori Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 17/208,528

(22) Filed: Mar. 22, 2021

(65) Prior Publication Data
US 2021/0307109 A1 Sep. 30, 2021

(30) Foreign Application Priority Data
Mar. 27, 2020 (JP) .............................. JP2020-057794

(51) Int. Cl.
*H04W 36/24* (2009.01)
*H04W 76/34* (2018.01)
(Continued)

(52) U.S. Cl.
CPC .......... *H04W 76/34* (2018.02); *G06F 9/4881* (2013.01); *H04W 76/20* (2018.02); *H04W 88/06* (2013.01)

(58) Field of Classification Search
CPC ..... H04W 76/34; H04W 76/20; H04W 88/06; H04W 36/03; H04W 36/36; H04W 84/12;
(Continued)

(56) References Cited

U.S. PATENT DOCUMENTS 9,572,034 B1 * 2/2017 Lu ......................... H04W 12/06
2002/0019884 A1 * 2/2002 Gungabeesoon ....... G06F 9/541
719/310
(Continued)

FOREIGN PATENT DOCUMENTS

JP 2007166577 A 6/2007
JP 2014086844 A 5/2014

*Primary Examiner* — Andrew Wendell
(74) *Attorney, Agent, or Firm* — Canon U.S.A., Inc. IP Division

(57) ABSTRACT

A communication apparatus that participates in a network includes a first communication unit which establishes communication with a data processing apparatus via the network and performs data communication with the data processing apparatus according to a first communication method, a control unit controlling execution of a plurality of applications including an application for communicating with the data processing apparatus, a reception unit receiving an instruction for switching the application, and a determination unit, if the reception unit has received an instruction for switching the application to another application while the first communication unit has established communication with the data processing apparatus according to the first communication method, determining whether the another application indicated as a switching destination by the received instruction requires connection to the Internet. The control unit controls whether to cut off the established communication which uses the first communication method depending on a result of the determination.

10 Claims, 12 Drawing Sheets

(51) Int. Cl.
*G06F 9/48* (2006.01)
*H04W 88/06* (2009.01)
*H04W 76/20* (2018.01)

(58) Field of Classification Search
CPC ..... H04W 36/08; H04W 36/16; H04W 36/24; G06F 9/4881
See application file for complete search history.

(56) References Cited

U.S. PATENT DOCUMENTS

| | | | |
|---|---|---|---|
| 2008/0267167 A1* | 10/2008 | Apelqvist | H04W 8/22 370/352 |
| 2010/0274922 A1* | 10/2010 | Reavely | H04L 67/145 709/238 |
| 2011/0081008 A1* | 4/2011 | Lawson | H04M 15/61 379/114.03 |
| 2020/0274805 A1* | 8/2020 | Yang | H04L 12/28 |
| 2022/0201569 A1* | 6/2022 | Horita | H04W 36/30 |

\* cited by examiner

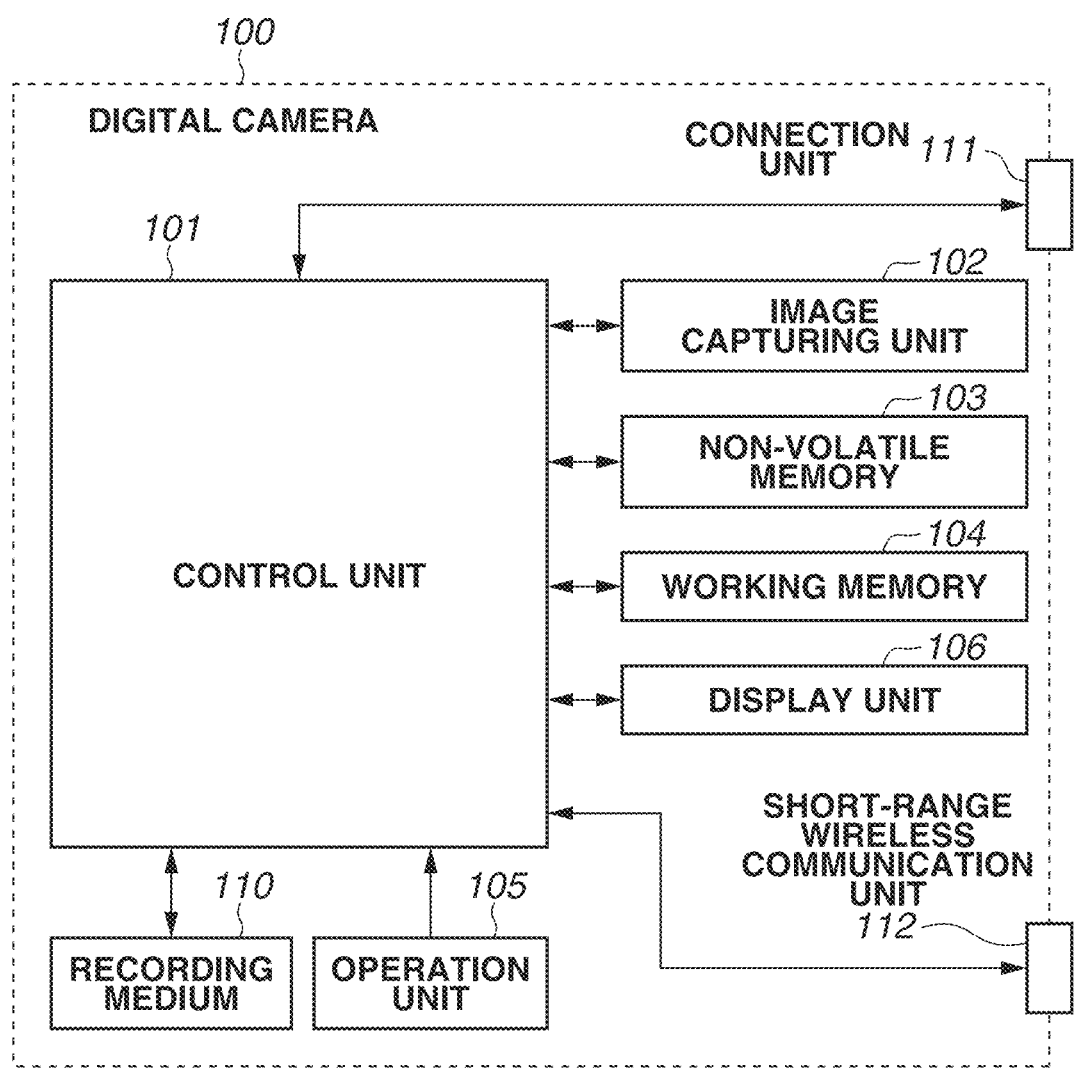

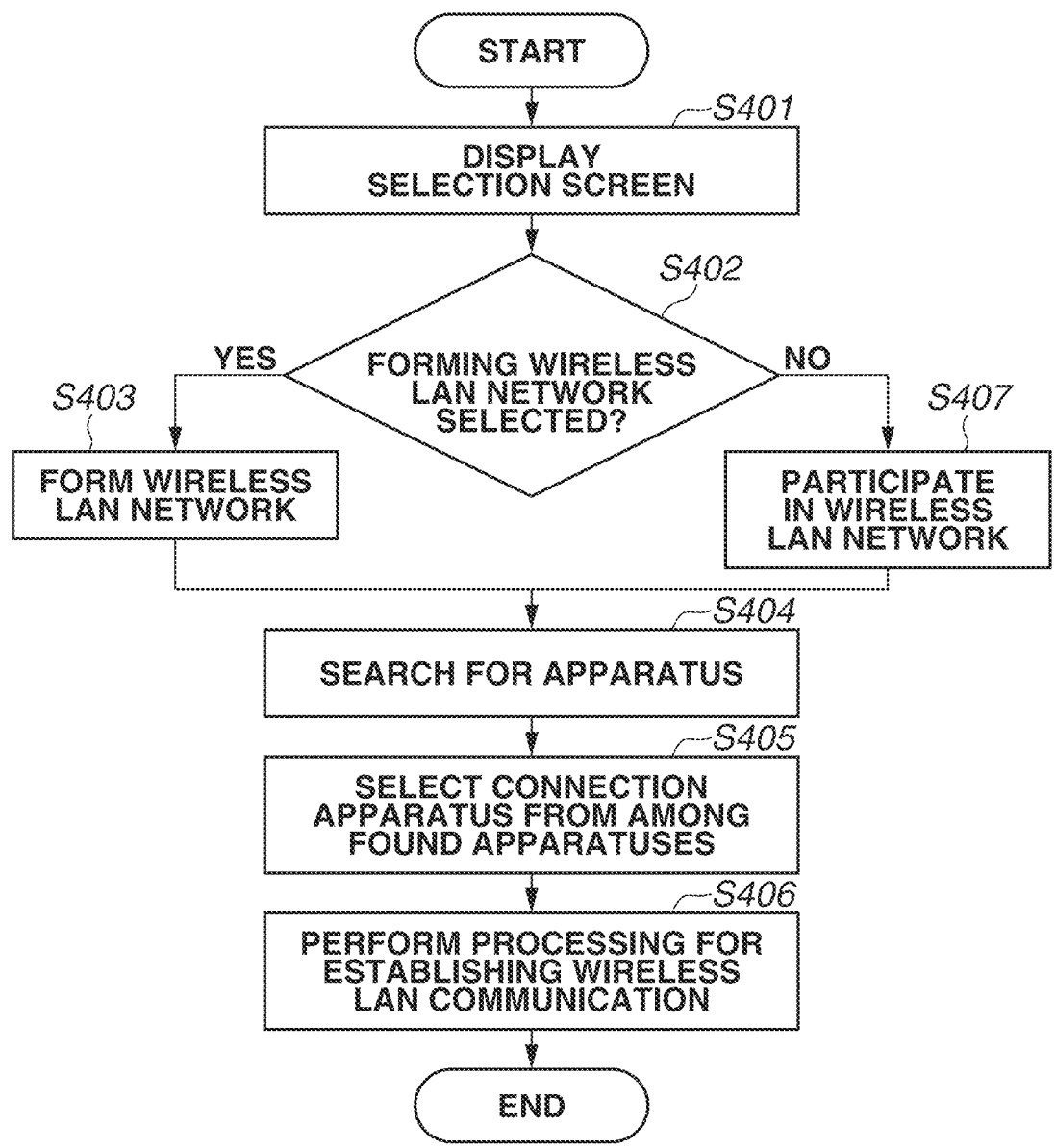

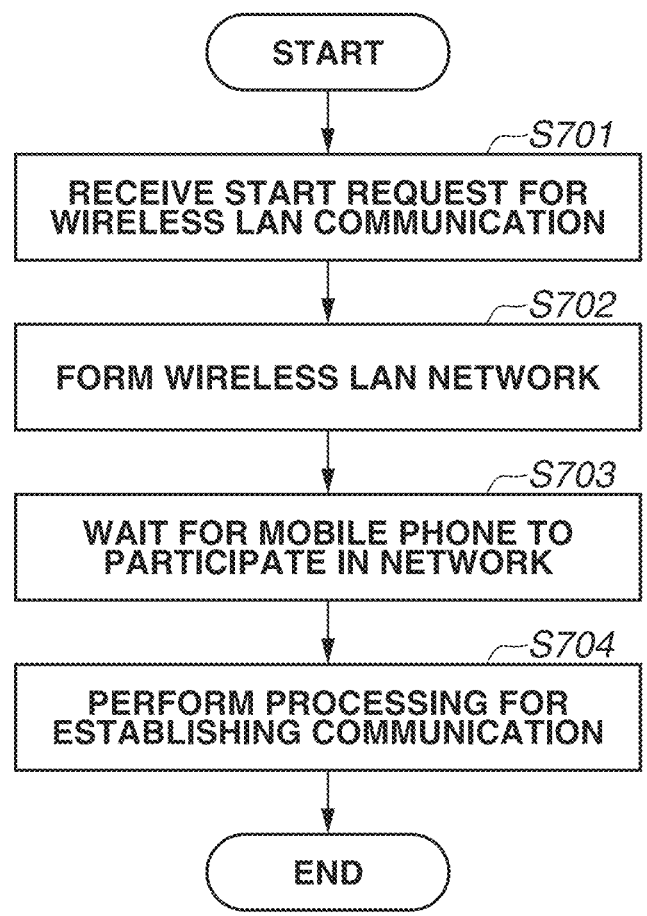

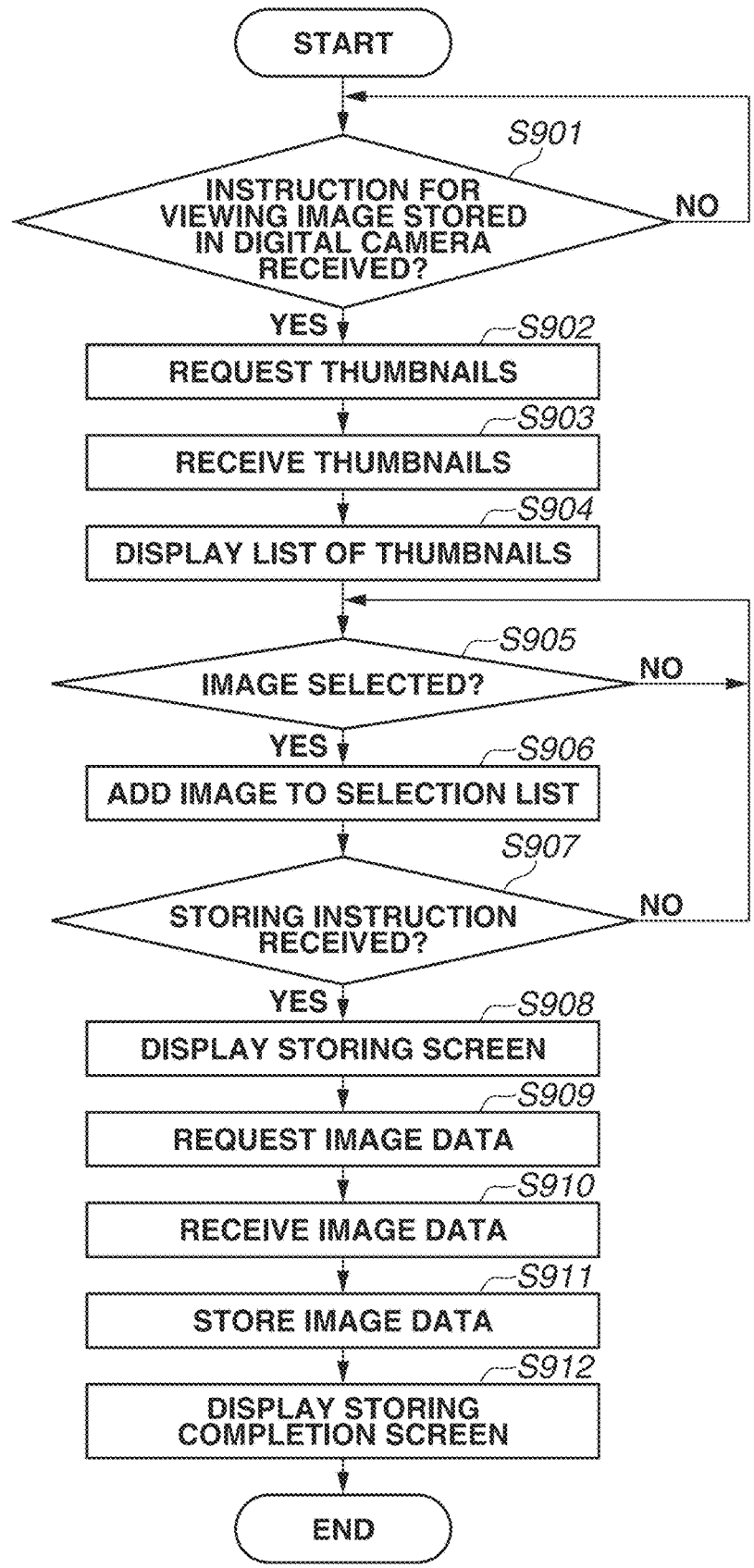

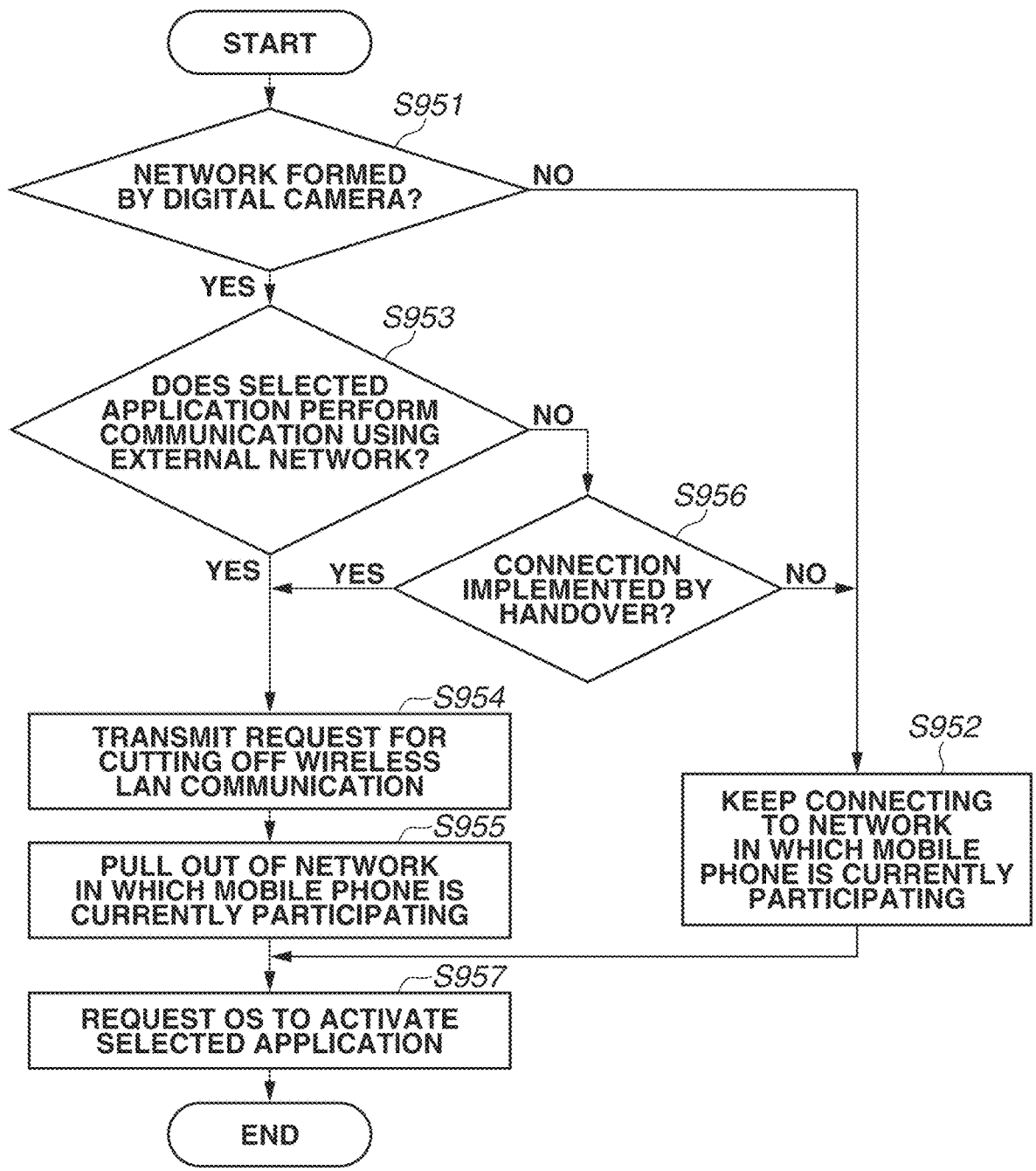

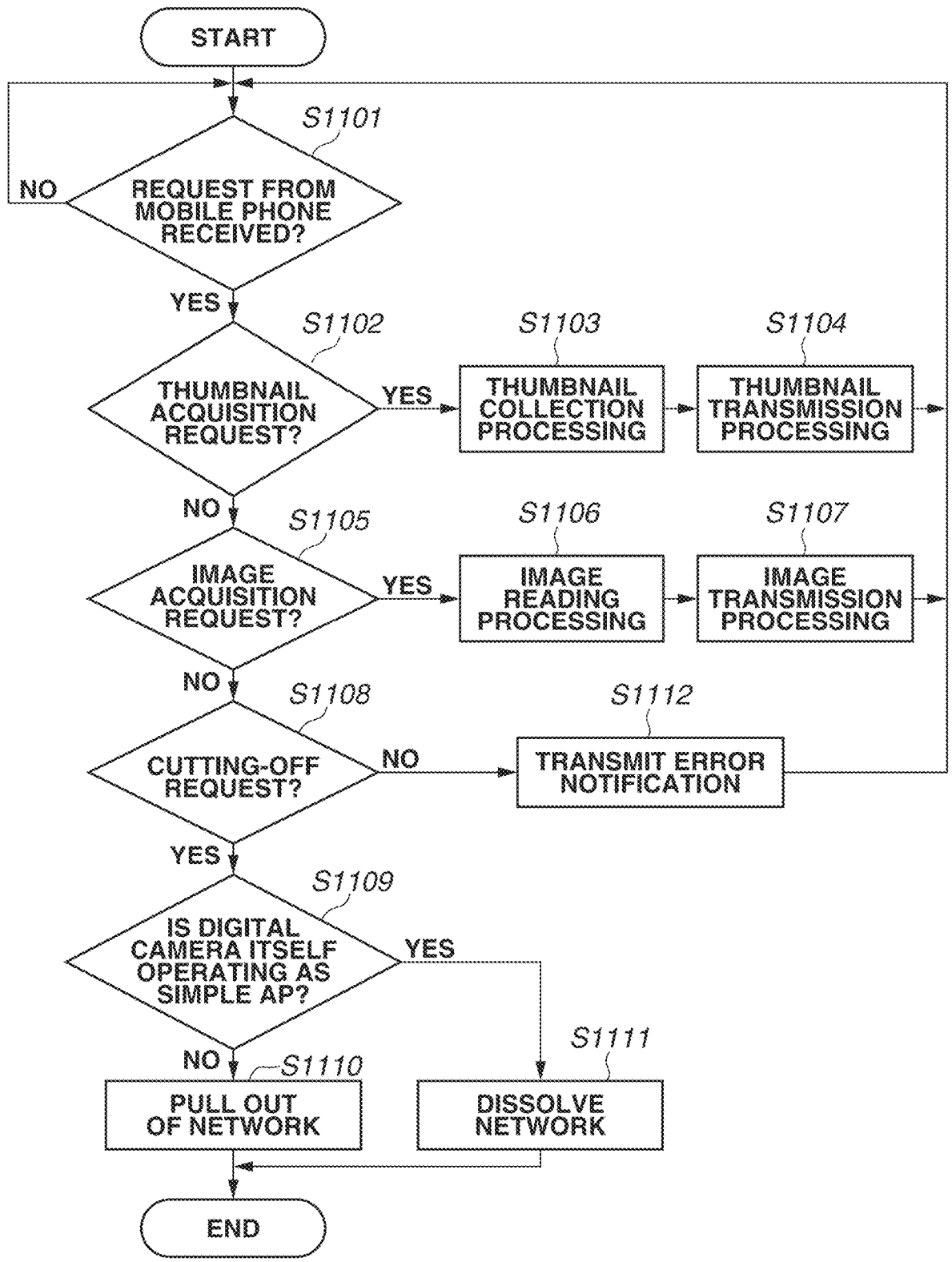

COMMUNICATION APPARATUS CAPABLE OF WIRELESSLY COMMUNICATING WITH ANOTHER APPARATUS, CONTROL METHOD THEREFOR, AND STORAGE MEDIUM

BACKGROUND

Field

Aspects of the present disclosure generally relate to a communication apparatus capable of wirelessly communicating with another apparatus, a control method therefor, and a storage medium.

Description of the Related Art

There is known a technique of equipping a data processing apparatus, such as a digital camera, with a wireless communication function and transmitting image data stored in the data processing apparatus to an external apparatus, as discussed in Japanese Patent Application Laid-Open No. 2007-166577. Using this function enables more readily transmitting image data to an external apparatus.

Moreover, in recent years, there has also become known a digital camera equipped with a simplified access point function. When the digital camera activates the simplified access point function, another apparatus can detect the digital camera as an access point and then participate in a network formed by the digital camera if desired. This functionality enables a digital camera and another apparatus to easily communicate with each other.

A relay apparatus, such as an access point, which is commonly used includes a circuit line which connects to, for example, a public network, and the relay apparatus is thereby able to perform, for example, communication via the Internet. On the other hand, a data processing apparatus, such as a digital camera, does not include a circuit line which connects to, for example, a public network. Accordingly, a situation may arise where, even if participating in a network formed with a simplified access point function, another apparatus is not able to communicate with an external network, such as the Internet. In particular, apparatuses may exist, such as recent smartphones, which are controlled by an operating system (OS) in such a way as not to be able to perform data communication using a public network when they are in a state of participating in a network formed by an access point. To solve this issue, Japanese Patent Application Laid-Open No. 2014-86844 discusses a method in which, when a communication application to be used for communications between an external apparatus and a data processing apparatus is interrupted, the external apparatus pulls out of a network formed with a simplified access point function.

According to the method discussed in Japanese Patent Application Laid-Open No. 2014-86844, the communication application is switched to another application, using a switching-destination application, and when that occurs, the external apparatus, which serves as a communication apparatus, is able to use an external network via the switching-destination application. However, it is not necessarily the case that, when the communication application is switched to any another application, the communication apparatus needs to pull out of a network formed with a simplified access point. For example, it can be possible that, in a case where the communication application is switched to an application in which the Internet is assumed not to be used, the communication apparatus can continue to stay in a state of participating in a network formed with a simplified access point function, without any problems arising. If the communication apparatus is configured to pull out of a network formed with a simplified access point function even in such a case, inefficiencies can result. For example, in a case where a user wishes for the communication apparatus to communicate with a data processing apparatus again, the user may need to perform again a procedure for enabling the communication apparatus to communicate with the data processing apparatus, causing the user to expend needless time and effort.

SUMMARY

According to various embodiments of the present disclosure, a communication apparatus that is able to participate in a network includes a first communication unit configured to establish communication with a data processing apparatus via the network and perform data communication with the data processing apparatus according to a first communication method, a control unit configured to control execution of a plurality of applications including an application for use in communicating with the data processing apparatus, a reception unit configured to receive an instruction for switching the application, and a determination unit configured to, in a case where the reception unit has received an instruction for switching the application to another application while the first communication unit has established communication with the data processing apparatus according to the first communication method, determine whether the another application indicated as a switching destination by the received instruction for switching the application requires connection to the Internet. The control unit controls whether to cut off the established communication which uses the first communication method depending on a result of the determination performed by the determination unit.

Further features of various embodiments of the present disclosure will become apparent from the following description of exemplary embodiments with reference to the attached drawings.

BRIEF DESCRIPTION OF THE DRAWINGS

FIG. 1 is a block diagram illustrating a configuration of a digital camera according to an exemplary embodiment.

FIG. 4 is a flowchart illustrating an operation of the digital camera according to the present exemplary embodiment.

FIG. 7 is a flowchart illustrating an operation of the digital camera according to the present exemplary embodiment.

FIGS. 9A and 9B are flowcharts illustrating operations of the mobile phone according to the present exemplary embodiment.

FIG. 11 is a flowchart illustrating an operation of the digital camera according to the present exemplary embodiment.

DESCRIPTION OF THE EMBODIMENTS

Figure 2A:
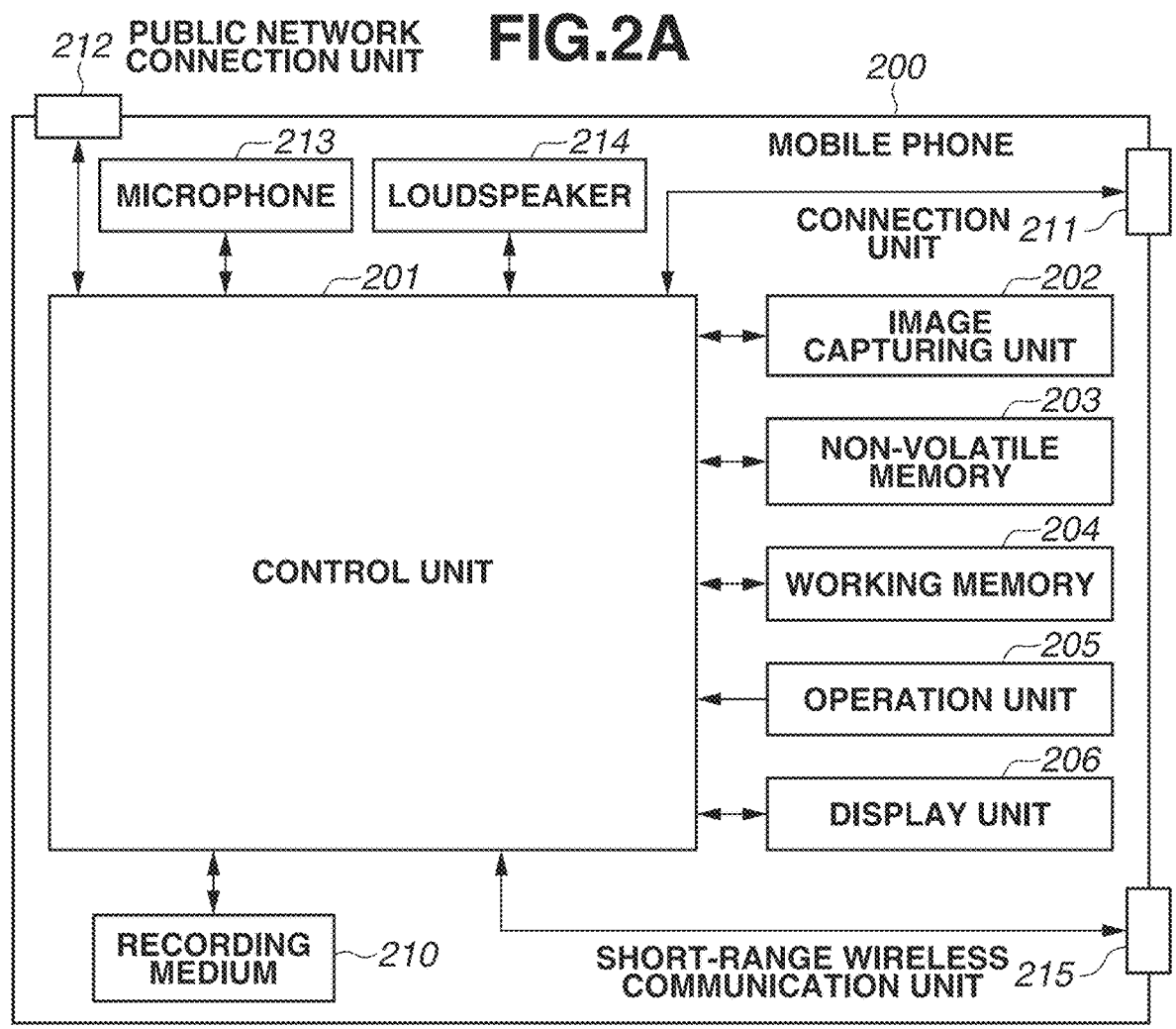
FIG. 2A is a block diagram illustrating a configuration of a mobile phone in the present exemplary embodiment.

Various exemplary embodiments, features, and aspects of various embodiments of the present disclosure will be described in detail below with reference to the drawings.

Furthermore, exemplary embodiments which are described below are merely examples of implementations of the embodiments of the disclosure, and can be changed or modified as appropriate depending on configurations of apparatuses to which the invention is applied and various conditions. Moreover, some or all of the exemplary embodiments can be combined as appropriate.

<Configuration of Digital Camera>

FIG. 1 is a block diagram illustrating a configuration example of a digital camera 100, which is an example of a data processing apparatus in an exemplary embodiment of the present disclosure. Furthermore, while, in the present exemplary embodiment, a digital camera is taken as an example of a data processing apparatus, the data processing apparatus is not limited to this. For example, the data processing apparatus can be a portable media player or an information processing apparatus such as what is called a tablet device or a personal computer.

A control unit 101 controls each unit of the digital camera 100 according to an input signal or a program described below. Furthermore, instead of the control unit 101 controlling the entire digital camera 100, a plurality of pieces of hardware can be configured to share a processing operation to control the entire digital camera 100.

An image capturing unit 102 converts subject light formed by a lens included in the image capturing unit 102 into an electrical signal, performs, for example, noise reduction processing on the electrical signal to generate digital data, and outputs the digital data as image data. After once being stored in a buffer memory, the captured image data is subjected to a predetermined arithmetic operation by the control unit 101 and is then recorded on a recording medium 110.

A non-volatile memory 103 is an electrically erasable and recordable non-volatile memory, and stores, for example, a program described below, which is to be executed by the control unit 101.

A working memory 104 is used as, for example, a buffer memory which temporarily stores image data captured by the image capturing unit 102, an image display memory used for a display unit 106, and a workspace used for the control unit 101.

An operation unit 105 is used to receive an instruction issued to the digital camera 100 from the user. The operation unit 105 includes operation members such as a power button used for the user to issue an instruction to power on and off the digital camera 100, a release switch used for the user to issue an instruction to perform image capturing, and a playback button used for the user to issue an instruction to play back image data. Moreover, the operation unit 105 further includes a touch panel described below, which is formed on the display unit 106. Furthermore, the release switch includes a switch SW1 and a switch SW2. In response to the release switch entering into what is called a half-pressed state, the switch SW1 is turned on. This causes the digital camera 100 to receive instructions to perform image capturing preparations for, for example, autofocus (AF) processing, automatic exposure (AE) processing, automatic white balance (AWB) processing, and electronic flash (EF) pre-emission processing. Moreover, in response to the release switch entering into what is called a fully-pressed state, the switch SW2 is turned on. This causes the digital camera 100 to receive an instruction to perform image capturing.

The display unit 106 performs, for example, displaying of a viewfinder image for use in image capturing, displaying of captured image data, and displaying of characters for use in an interactive operation. Furthermore, the digital camera 100 does not necessarily need to have the display unit 106 built-in. The digital camera 100 only needs to be able to connect to an internal or external display unit 106 and have at least a display control function for controlling a displaying operation of the display unit 106.

The recording medium 110 is able to record image data output from the image capturing unit 102. The recording medium 110 can be configured to be attachable to and detachable from the digital camera 100 or be built into the digital camera 100. Thus, the digital camera 100 only needs to include a unit configured to access at least the recording medium 110.

A connection unit 111 is an interface used to connect to an external apparatus. The digital camera 100 in the present exemplary embodiment is able to perform exchange of data with an external apparatus via the connection unit 111. Furthermore, in the present exemplary embodiment, the connection unit 111 includes an interface used to communicate with an external apparatus via a wireless local area network (LAN). The control unit 101 controls the connection unit 111 to implement wireless communication with an external apparatus. Furthermore, the communication method is not limited to a wireless LAN communication method.

Furthermore, the digital camera 100 in the present exemplary embodiment is able to operate as a slave device for use in an infrastructure mode of the wireless LAN communication. In the case of operating as a slave device, the digital camera 100 is able to connect to a nearby access point (hereinafter referred to as an "AP") to participate in a network formed by the AP. Moreover, the digital camera 100 in the present exemplary embodiment is a type of AP, but is also able to operate as a simplified AP (hereinafter referred to as a "simple AP") which is more limited in function. Furthermore, an AP in the present exemplary embodiment is an example of a relay apparatus. When the digital camera 100 operates as a simple AP, the digital camera 100 itself forms a network. An apparatus located near the digital camera 100 recognizes the digital camera 100 as an AP and thus becomes able to participate in the network formed by the digital camera 100. As mentioned above, the program used to cause the digital camera 100 to operate is assumed to be stored in a non-volatile memory 103.

Furthermore, the digital camera 100 in the present exemplary embodiment is a type of AP, but is a simple AP which does not have a gateway function for transferring data received from a slave device to, for example, an Internet provider. Accordingly, even if receiving data from another apparatus participating in a network formed by the digital camera 100 itself, the digital camera 100 is not able to transfer the received data to a network such as the Internet.

A short-range wireless communication unit 112 is configured with, for example, an antenna used for wireless communication, a modulation and demodulation circuit used for processing a wireless signal, and a communication controller. The short-range wireless communication unit 112 implements short-range wireless communication compliant with the standard of IEEE 802.15 (what is called Bluetooth®) by outputting a modulated wireless signal from the antenna or demodulating a wireless signal received via the antenna. In the present exemplary embodiment, Bluetooth communication employs Version 4.0 of Bluetooth Low Energy, which provides reduced power consumption. Such Bluetooth communication has a range available for communication narrower than that of wireless LAN communication (i.e., has a shorter distance available for communication). Moreover, Bluetooth communication is lower in communication speed than wireless LAN communication. On the other hand, Bluetooth communication is smaller in power consumption than wireless LAN communication.

Thus far is the description of the digital camera 100. Next, a mobile phone 200, which is an example of an external apparatus, is described.

<Configuration of Mobile Phone>

FIG. 2A is a block diagram illustrating a configuration example of the mobile phone 200, which is an example of a communication apparatus in the present exemplary embodiment. Furthermore, while a mobile phone is described as an example of a communication apparatus, the communication apparatus is not limited to this. For example, the communication apparatus can be a portable media player or an information processing apparatus such as what is called a tablet device, a personal computer, or a smartphone.

A control unit 201 controls each unit of the mobile phone 200 according to an input signal or a program described below. Furthermore, instead of the control unit 201 controlling the entire mobile phone 200, a plurality of pieces of hardware can be configured to share a processing operation to control the entire mobile phone 200.

An image capturing unit 202 converts subject light formed by a lens included in the image capturing unit 202 into an electrical signal, performs, for example, noise reduction processing on the electrical signal to generate digital data, and outputs the digital data as image data. After once being stored in a buffer memory, the captured image data is subjected to a predetermined arithmetic operation by the control unit 201 and is then recorded on a recording medium 210.

A non-volatile memory 203 is an electrically erasable and recordable non-volatile memory, and stores, for example, an operating system (OS) serving as basic software and various programs, which are to be executed by the control unit 201. A program used for communicating with the digital camera 100 is assumed to be stored in the non-volatile memory 203 and be thus installed as a camera communication application. Furthermore, processing to be performed by the mobile phone 200 in the present exemplary embodiment is implemented by the mobile phone 200 reading therein a program which is provided by the camera communication application. Furthermore, the camera communication application is assumed to include a program used for using a basic function of the OS installed on the mobile phone 200 (for example, a wireless LAN function, a Bluetooth function, and functions for invoking other applications). Moreover, the camera communication application includes a remote image capturing function for enabling the user to perform image capturing with the digital camera 100 by a remote operation via the mobile phone 200 while viewing a live view image obtained from the digital camera 100 via the mobile phone 200. Additionally, the camera communication application includes a remote viewing function for enabling the user to remotely view image data recorded on a recording medium mounted in the digital camera 100 or for receiving such image data.

Furthermore, the OS of the mobile phone 200 can be configured to include a program for implementing processing which is to be performed in the present exemplary embodiment.

A working memory 204 is used as, for example, a buffer memory which temporarily stores image data captured by the image capturing unit 202, an image display memory used for a display unit 206, and a workspace used for the control unit 201.

An operation unit 205 is used to receive an instruction issued to the mobile phone 200 from the user. The operation unit 205 includes, for example, operation members such as a power button used for the user to issue an instruction to power on and off the mobile phone 200 and a touch panel formed on the display unit 206.

The display unit 206 performs, for example, displaying of image data and displaying of characters used for an interactive operation. Furthermore, the mobile phone 200 does not necessarily need to have the display unit 206 built-in. The mobile phone 200 only needs to be able to connect to an internal or external display unit 206 and have at least a display control function for controlling a displaying operation of the display unit 206.

The recording medium 210 is able to record image data output from the image capturing unit 202 or image data received from a data processing apparatus. The recording medium 210 can be configured to be attachable to and detachable from the mobile phone 200 or be built into the mobile phone 200. Thus, the mobile phone 200 only needs to include a unit configured to access at least the recording medium 210.

A connection unit 211 is an interface used to connect to an external apparatus. The mobile phone 200 in the present exemplary embodiment is able to perform exchange of data with an external apparatus via the connection unit 211. Furthermore, in the present exemplary embodiment, the connection unit 211 includes an interface used to communicate with an external apparatus via a wireless LAN. The control unit 201 controls the connection unit 211 to implement wireless communication with an external apparatus. Furthermore, the mobile phone 200 in the present exemplary embodiment is able to operate as a slave device for use in an infrastructure mode of the wireless LAN communication, and is able to participate in a network formed by a nearby AP.

A public network connection unit 212 is an interface used to perform public wireless communication. The mobile phone 200 is able to be used to make a voice call or perform data communication with another apparatus via the public network connection unit 212. In the case of a call, the control unit 201 performs inputting and outputting of a voice signal via a microphone 213 and a loudspeaker 214. In the present exemplary embodiment, the public network connection unit 212 is assumed to include an interface used to perform communication using 3G. Furthermore, the present exemplary embodiment is not limited to 3G, but can use another communication method such as Long-Term Evolution (LTE), Worldwide Interoperability for Microwave Access (WiMAX), asymmetric digital subscriber line (ADSL), Fiber To The Home (FTTH), or what is called 4G. Moreover, the connection unit 211 and the public network connection unit 212 do not necessarily need to be configured with independent pieces of hardware, but can be configured with, for example, a single antenna in a shared manner.

A short-range wireless communication unit 215 is an interface used to perform short-range wireless connection with another external apparatus. The mobile phone 200 in the present exemplary embodiment is able to perform exchange of data with another external apparatus via the short-range wireless communication unit 215. Furthermore, in the present exemplary embodiment, the short-range wireless communication unit 215 includes an interface used to communicate with another external apparatus by Bluetooth. The control unit 201 implements Bluetooth communication with another external apparatus by controlling the short-range wireless communication unit 215.

Figure 2B:
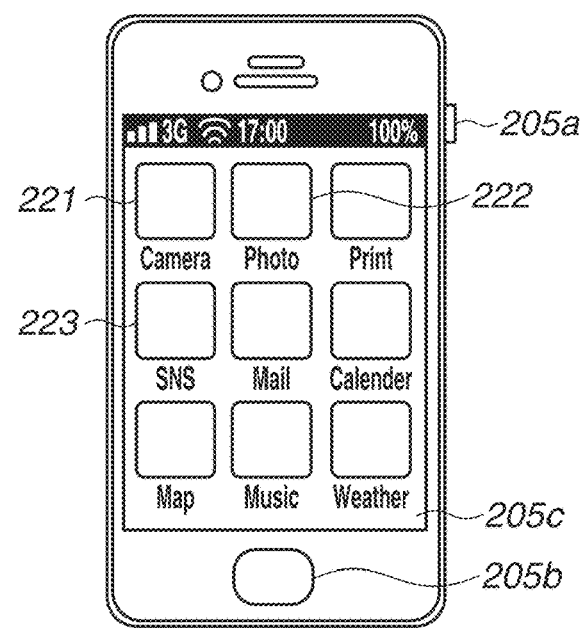
FIG. 2B is a diagram illustrating an example of an outer appearance of the mobile phone according to the present exemplary embodiment.

Next, an outer appearance of the mobile phone 200 is described. FIG. 2B is a diagram illustrating an example of an outer appearance of the mobile phone 200. A power button 205a, a home button 205b, and a touch panel 205c are operation members included in the above-mentioned operation unit 205. The home button 205b is operable by being pressed by the user to interrupt the use of an application which is being executed and then display, on the display unit 206, a home screen available for selecting another application.

Items corresponding to the respective applications are arranged on the home screen of the mobile phone 200 and are operable to activate the respective applications or invoke an application which is running in the background. For example, an item 221 is an item for a camera communication application used for the mobile phone 200 to communicate with the digital camera 100 in the present exemplary embodiment. An item 222 is an item for an image display application used for the user to view an image stored in the mobile phone 200. An item 223 is an item for a social networking service (SNS) application used for the user to communicate with a server and then share, for example, an image or text with another user. In the present exemplary embodiment, the camera communication application is an application which is provided by a manufacturer of the digital camera 100 via an application distribution site. Moreover, the image display application is assumed to be an application which is previously installed on the mobile phone 200 (i.e., is assumed to be an application installed as standard on an operating system (OS) of the mobile phone 200). The SNS application is an application which is provided by a developer thereof via an application distribution site.

In the home screen, for example, when the item 221 is pressed (touched), the camera communication application in the case of being not yet activated is newly activated and operates to display a screen thereof. The camera communication application in the case of being already executed in the background is not newly activated and operates to transition to the foreground and re-display a screen thereof.

Moreover, in the mobile phone 200, inputting a specific instruction to the OS enables switching between applications without via the home screen and executing the selected application. At this time, an application which is being executed at the time of inputting of a specific instruction is caused to transition to the background. Then, the application selected by the instruction for switching is newly activated or is caused to transition from the background to the foreground to become able to operate.

Thus far is the description of the mobile phone 200.

<Outline of Connection Configuration>

Figure 3A:
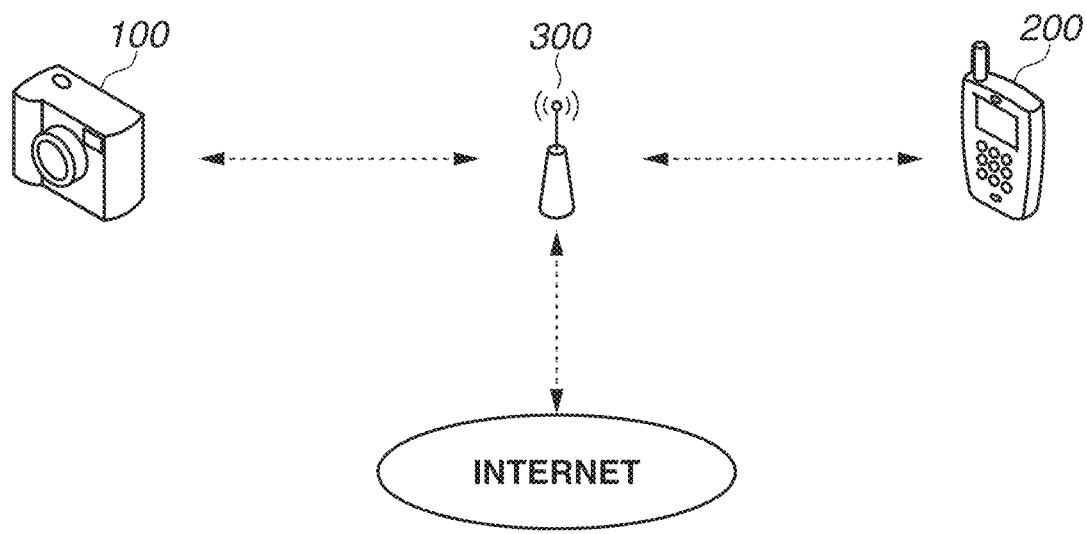
FIGS. 3A and 3B are diagrams illustrating network configurations according to the present exemplary embodiment.
Figure 3B:
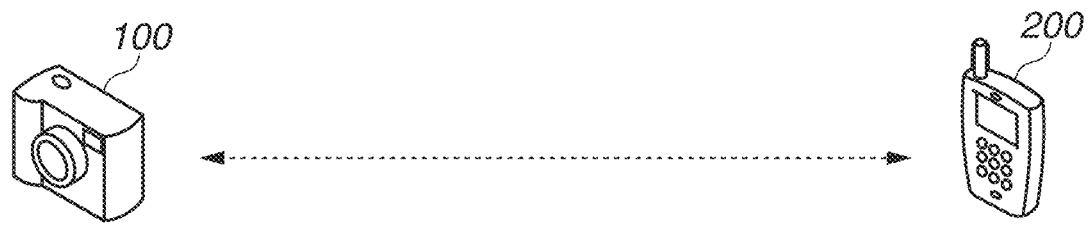

FIGS. 3A and 3B are diagrams each schematically illustrating a connection configuration for wireless LAN communication between the digital camera 100 and the mobile phone 200 in the present exemplary embodiment. In a case where the digital camera 100 and the mobile phone 200 transmit and receive data to and from each other via wireless LAN communication, two connection configurations illustrated in FIGS. 3A and 3B are conceivable.

FIG. 3A illustrates a configuration in which the digital camera 100 and the mobile phone 200 participate in a wireless LAN network which is formed by an external access point (AP) 300, which is an example of an external relay apparatus. The digital camera 100 and the mobile phone 200 detect a beacon signal which the external AP 300 periodically transmits, and thus participate in a wireless LAN network formed by the external AP 300. After participating in the same wireless LAN network, the digital camera 100 and the mobile phone 200 enter into a state of being able to transmit and receive data to and from each other via a wireless LAN after discovering each other and acquiring capability information about each other (i.e., establish communication with each other).

Moreover, the external AP 300 in the present exemplary embodiment is able to connect to an external network, such as the Internet, via, for example, a public network. Accordingly, the mobile phone 200 is able to transmit data onto the Internet via the external AP 300.

FIG. 3B illustrates a configuration in which the digital camera 100 and the mobile phone 200 directly connect to each other without via the external AP 300. In this case, the digital camera 100 operates as a simple AP and thus forms a wireless LAN network. When operating as a simple AP, the digital camera 100 starts periodical transmission of a beacon signal. The mobile phone 200 detects a beacon signal and then participates in a wireless LAN network formed by the digital camera 100. Then, as with the case illustrated in FIG. 3A, the digital camera 100 and the mobile phone 200 enter into a state of being able to transmit and receive data to and from each other after discovering each other and acquiring capability information about each other.

Furthermore, as mentioned above, the digital camera 100 in the present exemplary embodiment does not include a function for communicating with an external network such as the Internet. Accordingly, the mobile phone 200 when participating in a wireless LAN network formed by the digital camera 100 is not able to transmit data to, for example, the Internet via a simple AP.

As described above, there are two types of connection configurations in wireless LAN communication between the digital camera 100 and the mobile phone 200. In the present exemplary embodiment, an example of performing appropriate control according to these connection configurations is described.

<Connection Processing>

FIG. 4 is a flowchart illustrating processing which the digital camera 100 performs when connecting to the mobile phone 200. Furthermore, processing illustrated in the present flowchart is implemented by the control unit 101 of the digital camera 100 controlling each unit of the digital camera 100 according to an input signal and a program. Furthermore, unless otherwise described, the same also applies to other flowcharts illustrating processing which the digital camera 100 performs. The present flowchart is started in response to the user of the digital camera 100 issuing an instruction to connect to another apparatus via, for example, a menu operation.

Figure 5A:
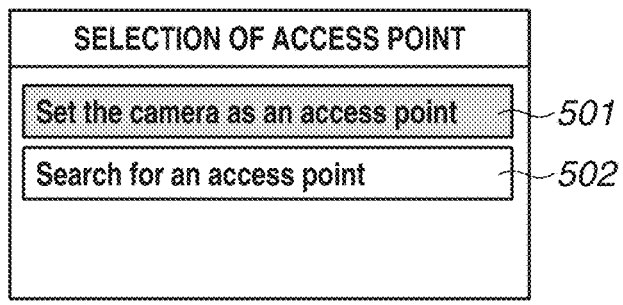
FIGS. 5A, 5B, 5C, 5D, 5E, and 5F are diagrams illustrating examples of display screens according to the present exemplary embodiment.

In step S401, the control unit 101 displays, on the display unit 106, a screen used for the user to select whether to cause the digital camera 100 to participate in a wireless LAN network formed by an external AP or whether to cause the digital camera 100 to operate as a simple AP. FIG. 5A illustrates an example of a screen which is displayed in the present step.

If, in step S402, it is determined that a button 501 has been selected by a user operation, the control unit 101 determines that forming a wireless LAN network has been selected (YES in step S402) and then advances the processing to step S403. If, in step S402, it is determined that a button 502 has been selected by a user operation, the control unit 101 determines that participating in a wireless LAN network formed by an external AP has been selected (NO in step S402) and then advances the processing to step S407.

Figure 5B:
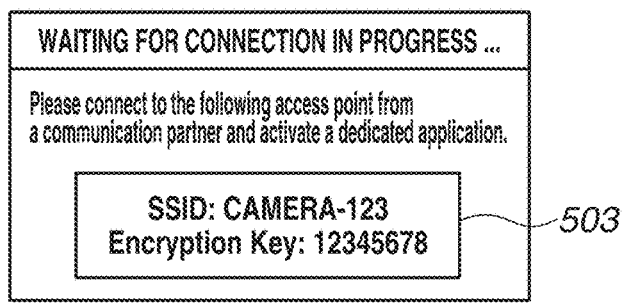

In step S403, the control unit 101 forms a wireless LAN network. Specifically, the control unit 101 generates an extended service set identifier (ESSID), a basic service set identifier (BSSID), an authentication method, an encryption type, and an encryption key, which are required to form a network. Moreover, the control unit 101 displays, on the display unit 106, at least the ESSID and the encryption key as information required for a connection apparatus to participate in a network. FIG. 5B illustrates an example of displaying of such information. In the example illustrated in FIG. 5B, as shown in a dialog 503, the ESSID is currently set to "CAMERA-123" and the encryption key is currently set to "12345678". Here, the ESSID of a wireless LAN network which the control unit 101 forms is assumed to be an identifier having a prefix "CAMERA-" appended thereto. Furthermore, the encryption key or the ESSID can be generated for each connection or for each connection apparatus, or can be always set to the same one. Additionally, in the present step, the control unit 101 performs allocation of an Internet Protocol (IP) address and setting of a subnet to enable communication with another apparatus, and then advances the processing to step S404.

Figure 5C:
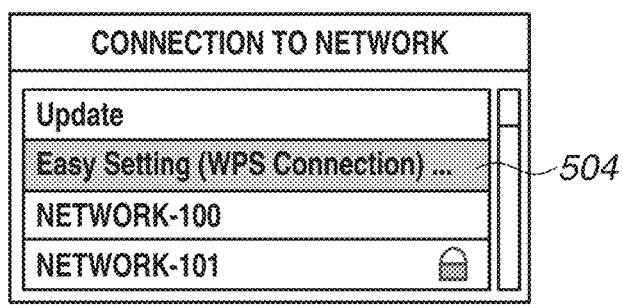

On the other hand, when having advanced the processing to step S407, the control unit 101 scans a nearby wireless LAN network and displays, on the display unit 106, a list of ESSIDs included in beacon signals detected as a result of scanning. FIG. 5C illustrates an example of a screen which is displayed at that time. In the example illustrated in FIG. 5C, ESSIDs "NETWORK-100" and "NETWORK-101" are currently detected. When a wireless LAN network is selected by a user operation from a list 504 illustrated in FIG. 5C, the control unit 101 performs processing for participating in the selected wireless LAN network, i.e., processing for connecting to an AP. Additionally, to enable communication with another apparatus, the control unit 101 performs allocation of an IP address and setting of a subnet and then advances the processing to step S404.

Figure 5D:
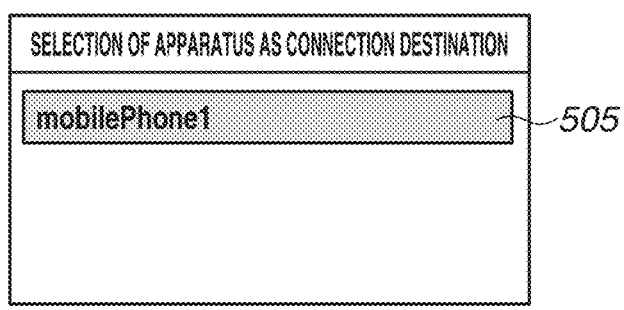
Figure 5E:
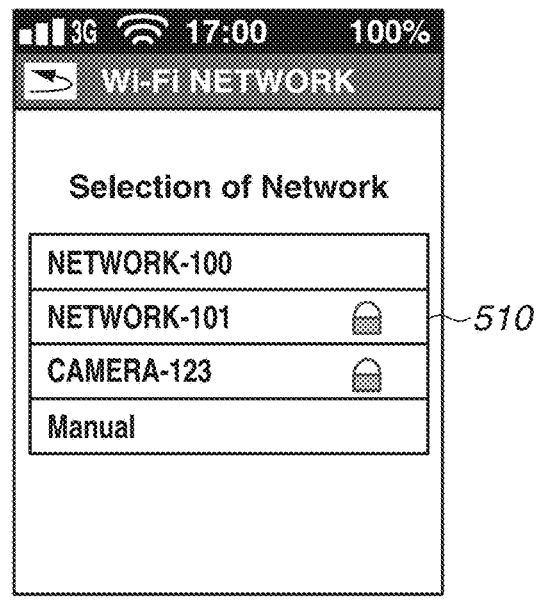

In step S404, the control unit 101 searches for an apparatus to which the digital camera 100 is able to connect within the same network. Furthermore, in order for the mobile phone 200 to enter into a state of being able to be searched for by the digital camera 100, performing an operation on the mobile phone 200 is necessary. In the following description, an operation to be performed on the mobile phone 200 is described with reference to FIGS. 5A, 5B, 5C, 5D, 5E, and 5F and FIGS. 6A and 6B. FIGS. 6A and 6B are flowcharts illustrating processing which the mobile phone 200 in the present exemplary embodiment performs and which corresponds to the processing illustrated in FIG. 4. Furthermore, processing illustrated in the present flowchart is implemented by the control unit 201 of the mobile phone 200 controlling each unit of the mobile phone 200 according to an input signal and a program. In the present exemplary embodiment, processing illustrated in FIGS. 6A and 6B is implemented by the camera communication application and the OS, which the control unit 201 executes, cooperating with each other. Furthermore, unless otherwise described, the same also applies to other flowcharts illustrating processing which the mobile phone 200 performs.

First, in response to a predetermined operation being performed by the user of the mobile phone 200, in step S601, the control unit 201 displays, on the display unit 206, a screen used for the user to select a wireless LAN network in which to cause the mobile phone 200 to participate. When transitioning to such a screen, the control unit 201 performs scanning of a nearby wireless LAN network and then displays a list 510 of ESSIDs detected as a result of scanning. FIG. 5E illustrates an example of a screen showing such a list. While, in the present exemplary embodiment, these processing operations are performed by the functions of the OS of the mobile phone 200 before activation of the camera communication application, the camera communication application when having been activated in advance can perform such processing operations while cooperating with the functions of the OS. Here, in a case where the digital camera 100 is operating as a simple AP, the mobile phone 200 detects an ESSID of the digital camera 100 and displays the detected ESSID in a list 510. In the example illustrated in FIG. 5E, "CAMERA-123" is displayed as an ESSID of the digital camera 100.

In step S602, the control unit 201 waits for any ESSID to be selected from the list 510. If any ESSID is selected from the list 510 by a user operation (YES in step S602), then in step S603, the control unit 201 performs processing for participating in a wireless LAN network corresponding to the selected ESSID. With this processing, the mobile phone 200 completes participation in a network.

After the mobile phone 200 participates in a network, the user of the mobile phone 200 activates the camera communication application installed on the mobile phone 200. Processing which the mobile phone 200 performs after the camera communication application is activated is described with reference to the flowchart of FIG. 6B. Major functions of the camera communication application include a function of establishing communication with a digital camera existing within the same network and a function of transmitting and receiving content data such as image data with the digital camera.

Figure 5F:
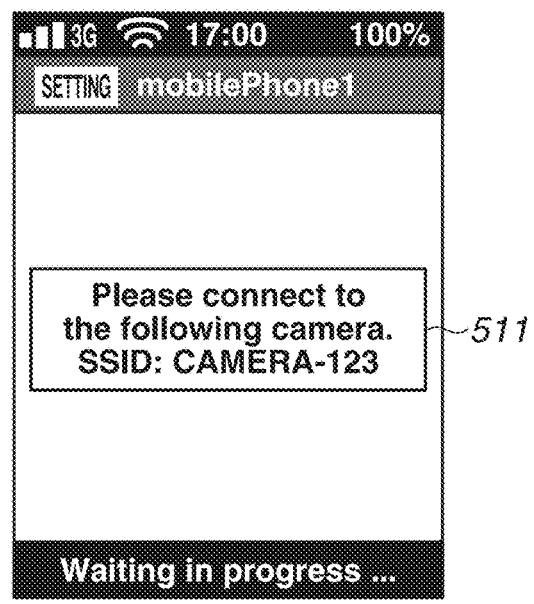
Figure 6A:
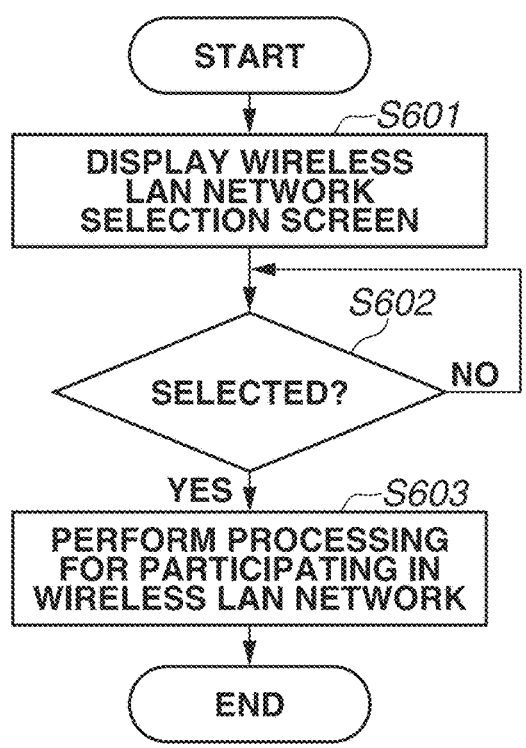
FIGS. 6A and 6B are flowcharts illustrating operations of the mobile phone according to the present exemplary embodiment.
Figure 6B:
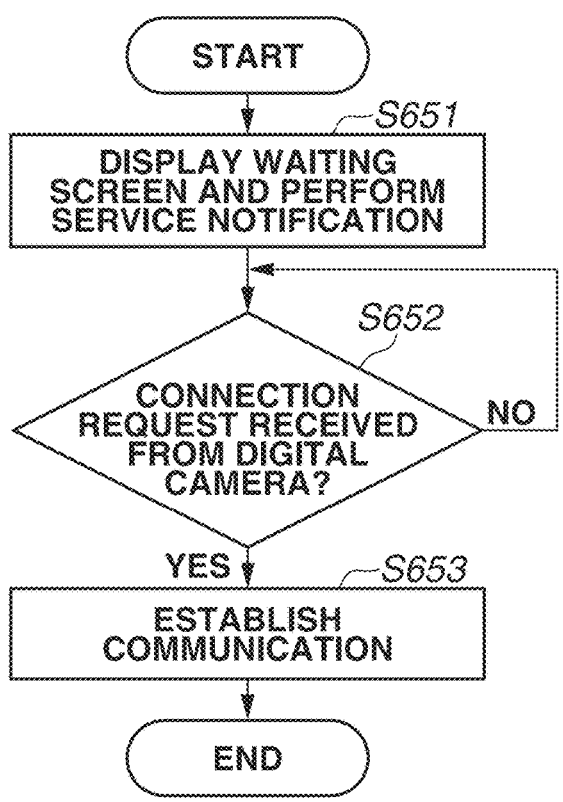

When the camera communication application is activated based on a user operation, then in step S651, the control unit 201 displays a waiting screen such as that illustrated in FIG. 5F on the display unit 206. An SSID in the network in which the mobile phone 200 is participating is displayed in a dialog 511. FIG. 5F illustrates an example of displaying in a case where "CAMERA-123" has been selected in the screen illustrated in FIG. 5E. Moreover, after the camera communication application is activated, the control unit 201 issues a notification of the service of the mobile phone 200 via the wireless LAN network to enable the digital camera 100 to detect the mobile phone 200. The digital camera 100 becomes able to detect the mobile phone 200 based on the issued notification of the service. Furthermore, such a notification of the service includes a device name and a universally unique identifier (UUID) of the mobile phone 200. In step S652, the control unit 201 waits for a connection request to be received from the digital camera 100. If it is determined that the connection request has been received (YES in step S652), then in step S653, the mobile phone 200 establishes communication with the digital camera 100.

The description refers back to FIG. 4. In step S404, the control unit 101 searches for apparatuses which are connectable and exist within the same network. As mentioned above, if a service notification is currently issued from the mobile phone 200, the digital camera 100 is able to detect the mobile phone 200. In the case of, as a result of search, having been detected connectable apparatuses, the control unit 101 displays, on the display unit 106, a list of device names included in the respective service notifications issued from the detected connectable apparatuses. FIG. 5D illustrates an example of the displayed list. Moreover, the control unit 101 stores, in the working memory 104, UUIDs, which are also included in the respective service notifications, and the device names while associating them with each other.

Furthermore, while, in the present exemplary embodiment, a configuration in which a device name and a UUID are included in each service notification is employed, another configuration in which the digital camera 100 inquires the mobile phone 200 of a device name and a UUID thereof can be employed.

In step S405, the control unit 101 receives a user operation indicating which of the device names displayed in list form in step S404 the user selects.

In step S406, the control unit 101 transmits a connection request to the mobile phone 200 using the UUID of the apparatus selected in step S405 and then establishes wireless LAN communication with the selected apparatus. Furthermore, while, in the present exemplary embodiment, the control unit 101 performs connection using a UUID of the connection destination apparatus, the control unit 101 can be configured to perform connection by identifying an IP address or port number from the UUID or can be configured to acquire an IP address at the time of performing a search.

<Handover from Bluetooth Communication to Wireless LAN Communication>

Here, the concept of handover is described. Handover described in the present exemplary embodiment refers to first transmitting and receiving, in a second communication method, information used for performing communication in a first communication method and then, with use of the information, establishing communication which is performed in the first communication method. Furthermore, in the present exemplary embodiment, a case where information used for performing communication in a first communication method is first transmitted and received in a second communication method and then, with use of the information, communication is performed in the first communication method is referred to as "performing handover from the second communication to the first communication".

In the present exemplary embodiment, handover from Bluetooth communication to wireless LAN communication is able to be performed in communication between the digital camera 100 and the mobile phone 200. In the present exemplary embodiment, at the time of handover from Bluetooth communication to wireless LAN communication, the digital camera 100 causes the digital camera 100 itself to operate as a simple AP, thus forming a wireless LAN network.

Furthermore, while the first communication method and the second communication method are able to be set in an optional manner, for example, setting the second communication method to a method for lower power consumption and the first communication method to a method for higher transfer speed enables using electric power in an efficient manner. For example, such a method of use that the second communication method is used at the time of waiting and is then switched to the first communication method at the time of transfer of a large volume of data is possible. Moreover, the mobile phone 200 receives, in the second communication method, information used for performing communication in the first communication method and then sets the received information via the OS, thus being able to perform wireless LAN connection without the user's trouble of a manual operation.

Specifically, it is possible to save the trouble of a manual operation in which the user selects an ESSID on the side of the mobile phone 200 or selects a communication configuration on the side of the digital camera 100.

In the following description, a flow of wireless LAN connection performed by handover from Bluetooth communication to wireless LAN communication is described with reference to FIG. 7 and FIGS. 8A and 8B. Here, the digital camera 100 and the mobile phone 200 are assumed to have already completed pairing of encrypted Bluetooth communication and established Bluetooth communication. Moreover, in the present exemplary embodiment, when Bluetooth communication has been established, the control unit 201 of the mobile phone 200 issues a notification of service of the mobile phone 200 itself to the digital camera 100 via the short-range wireless communication unit 215. Such a notification of service includes a device name, a UUID, and an IP address of the mobile phone 200. Moreover, in the present exemplary embodiment, when Bluetooth communication has been established, the control unit 101 of the digital camera 100 transmits, in advance, setting information about a wireless LAN network, which is formed by a flow of handover described below, to the mobile phone 200 via the short-range wireless communication unit 112. Such setting information about a wireless LAN network includes an ESSID and an encryption key of a wireless LAN network, which is formed by handover, and an IP address of the apparatus. Here, as with the case of forming a wireless LAN network in step S403, the ESSID of a wireless LAN network which the control unit 101 forms is assumed to be an identifier having a prefix "CAMERA-" appended thereto.

FIG. 7 is a flowchart illustrating processing which the digital camera 100 performs in handover from Bluetooth communication to wireless LAN communication. Processing in the present flowchart is implemented by the control unit 101 controlling each unit of the digital camera 100 according to an input signal or a program.

In step S701, the control unit 101 receives a start request for wireless LAN communication via the short-range wireless communication unit 112, and then advances the processing to step S702. Here, the start request for wireless LAN communication is a request which is transmitted via Bluetooth communication in step S801 illustrated in FIG. 8A by a processing operation described below of the control unit 201 of the mobile phone 200.

In step S702, the control unit 101 forms a wireless LAN network which accords with the setting information about a wireless LAN network transmitted to the mobile phone 200 at the time of Bluetooth communication. In other words, when having received a start request for wireless LAN communication via the short-range wireless communication unit 112, the digital camera 100 causes the digital camera 100 itself to operate as a simple AP.

In step S703, the control unit 101 searches for apparatuses connectable existing within the same network, and then waits for the mobile phone 200 to participate in the same network. Furthermore, here, in order for the mobile phone 200 to enter into a state of being able to be searched for by the digital camera 100, performing an operation on the mobile phone 200 is necessary.

Figure 8A:
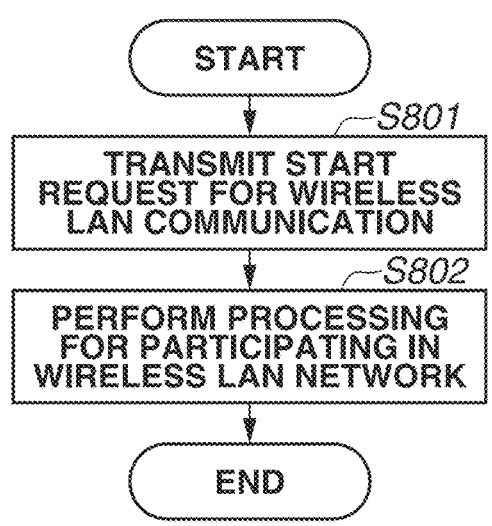
FIGS. 8A and 8B are flowcharts illustrating operations of the mobile phone according to the present exemplary embodiment.
Figure 8B:
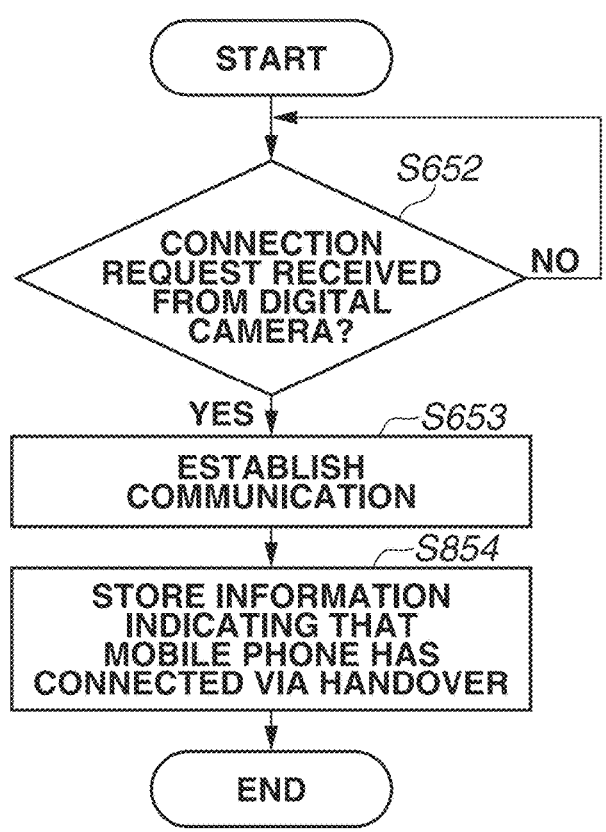

FIGS. 8A and 8B are flowcharts illustrating processing which the mobile phone 200 performs, corresponding to the processing illustrated in FIG. 7, in handover from Bluetooth communication to wireless LAN communication. Processing in the present flowcharts is implemented by the control unit 201 controlling each unit of the mobile phone 200 according to an input signal and a program. In the present exemplary embodiment, processing illustrated in FIGS. 8A and 8B is implemented by the camera communication application and the OS, which the control unit 201 executes, cooperating with each other. Furthermore, it is assumed that, when processing illustrated in FIGS. 8A and 8B is started, the camera communication application is activated in advance in the mobile phone 200.

First, processing which the mobile phone 200 performs until participating in a network is described with reference to the flowchart of FIG. 8A. The flowchart of FIG. 8A is started in response to a trigger which requires handover from Bluetooth communication to wireless LAN communication occurring at the time of Bluetooth communication. Such a trigger is, for example, a case where the camera communication application has received an instruction for executing a remote image capturing function or a remote viewing function. Moreover, such a trigger can be a case where an instruction for connection using a wireless LAN has merely been received.

In response to the above-mentioned trigger occurring, in step S801, the control unit 201 transmits a start request for wireless LAN communication to the digital camera 100 via the short-range wireless communication unit 215.

In step S802, the control unit 201 performs, based on the wireless LAN network setting information received in advance at the time of establishment of Bluetooth communication, processing for participating in a corresponding wireless LAN network. Here, the corresponding wireless LAN network is a wireless LAN network which the control unit 101 of the digital camera 100 has formed in step S702. This completes participation in a network.

Next, processing which the mobile phone 200 performs after participating in a network is described with reference to the flowchart of FIG. 8B. In FIG. 8B, steps which are in common with those illustrated in FIG. 6B are assigned the respective same step numbers and are omitted from description here.

In step S652, the control unit 201 waits for a connection request to be received from the digital camera 100. Upon receiving the connection request, in step S653, the control unit 201 establishes communication with the digital camera 100. Then, the control unit 201 performs processing corresponding to the trigger.

Then, in step S854, the control unit 201 stores, in the working memory 204, information indicating that the mobile phone 200 has connected to the digital camera 100 via handover from Bluetooth communication to wireless LAN communication.

The description refers back to FIG. 7. In step S703, the control unit 101 searches for an apparatus connectable which exists within the same network and then waists for the mobile phone 200 to participate in the formed wireless LAN network. Here, the control unit 101 detects whether the mobile phone 200 exists within the same network by performing discovery processing in the wireless LAN network using information about the service notification received from the mobile phone 200 at the time of start of connection for Bluetooth communication. When, as a result of search, confirming that the mobile phone 200 has participated in the wireless LAN network, the control unit 101 advances the processing to step S704.

In step S704, the control unit 101 transmits a connection request to the mobile phone 200 based on an IP address included in the service notification received from the mobile phone 200 at the time of establishment of Bluetooth communication, and thus establishes communication with the selected apparatus.

The case of performing wireless LAN connection by handover as described with reference to FIG. 7 and FIGS. 8A and 8B has an advantage in that the user's trouble of performing an operation for connection is smaller as compared to the case of performing wireless LAN connection without via Bluetooth communication as described with reference to FIG. 4 to FIGS. 6A and 6B.

<Operation at the Time of Reception of an Image which Mobile Phone Performs in Wireless LAN Communication>

Figure 10A:
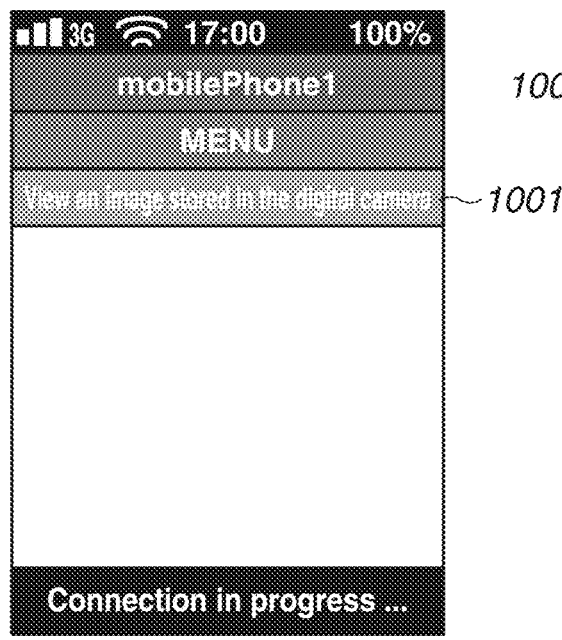
FIGS. 10A, 10B, 10C, and 10D are diagrams illustrating examples of display screens according to the present exemplary embodiment.

FIG. 10A illustrates an example of a menu screen of the camera communication application which is displayed on the display unit 206 of the mobile phone 200. A viewing button 1001 is displayed in the menu screen. The viewing button 1001 is a button which is used to execute a remote viewing function for causing image data stored in the digital camera 100 to be displayed on the display unit 206. Along with performing such displaying, the control unit 201 starts a flow illustrated in FIG. 9A.

FIG. 9A is a flowchart illustrating an operation which the mobile phone 200 performs after activating the camera communication application. For ease of explanation, here, the description focuses on a case where the present flowchart has been started in a state in which wireless LAN connection has been completed.

In step S901, the control unit 201 determines whether the viewing button 1001 has been selected. If it is determined that the viewing button 1001 has been selected (YES in step S901), the control unit 201 advances the processing to step S902. If it is determined that the viewing button 1001 has not been selected (NO in step S901), the control unit 201 repeats the processing.

In step S902, the control unit 201 requests, from the digital camera 100, thumbnails of image data stored in the digital camera 100. In response to this request, the digital camera 100 transmits the requested thumbnails to the mobile phone 200. Furthermore, the control unit 201 can transmit a command for requesting each thumbnail one by one or a command for collectively requesting a plurality of thumbnails.

Furthermore, the screen illustrated in FIG. 10A can be displayed even in a state in which connection for Bluetooth communication is currently established. In a case where, in that state, an instruction for executing a remote viewing function has been issued by a touch operation on the viewing button 1001 (i.e., in a case where the result of determination in step S901 is YES), after the control unit 201 performs the above-mentioned processing for handover before step S902, the control unit 201 performs step S902.

In step S903, the control unit 201 receives thumbnails transmitted from the digital camera 100 via the connection unit 211.

Figure 10B:
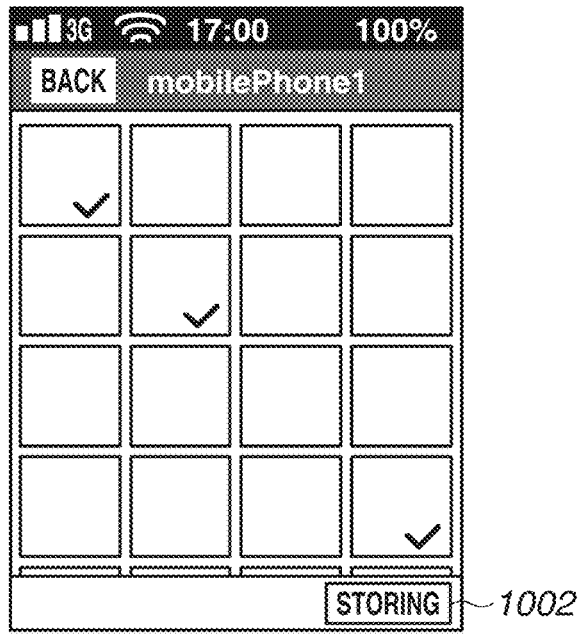

In step S904, the control unit 201 displays the received thumbnails in list form on the display unit 206. FIG. 10B illustrates an example of a display screen. In the example illustrated in FIG. 10B, thumbnails are displayed in four columns, and performing a scroll operation vertically enables further displaying other pieces of image data. Each of the displayed thumbnails can be brought into a selected state by being pressed (touched). Moreover, a storing button 1002 is included in the screen illustrated in FIG. 10B. The storing button 1002 is a button used to receive image data corresponding to the displayed thumbnail from the digital camera 100 and then store the received image data in the recording medium 210.

In step S905, the control unit 201 determines whether any thumbnail has been selected from among the thumbnails displayed in list form. If it is determined that a thumbnail has been selected (YES in step S905), the control unit 201 advances the processing to step S906. If not so (NO in step S905), the control unit 201 repeats step S905.

In step S906, the control unit 201 adds the image selected in step S905 to a selection list, and stores the selection list in the working memory 204.

In step S907, the control unit 201 determines whether a storing instruction has been issued by the storing button 1002 being selected (touched). If it is determined that a storing instruction has been issued (YES in step S907), the control unit 201 advances the processing to step S908. If not so (NO in step S907), the control unit 201 returns the processing to step S905.

Figure 10C:
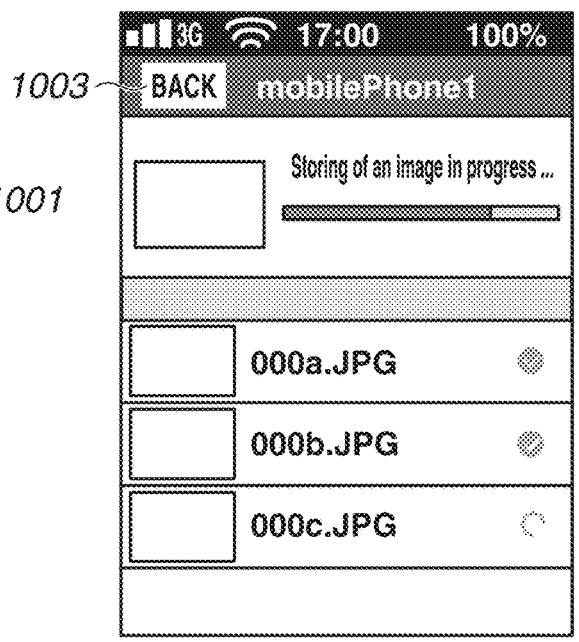

In step S908, the control unit 201 displays a storing screen illustrated in FIG. 10C on the display unit 206. Furthermore, the user of the mobile phone 200 is able to cancel reception by selecting a button 1003 illustrated in FIG. 10C. In a case where reception has been cancelled, the screen illustrated in FIG. 10C returns to the screen illustrated in FIG. 10B.

In step S909, the control unit 201 requests, from the digital camera 100, image data corresponding to the images included in the selection list stored in step S906. When the digital camera 100 transmits image data to the mobile phone 200 in response to the request, in step S910, the control unit 201 receives the image data and then stores the received image data in the working memory 204.

Upon completion of reception of the image data, in step S911, the control unit 201 stores the image data received in step S910 from the working memory 204 to the recording medium 210. Then, in step S912, the control unit 201 displays a storing completion screen illustrated in FIG. 10D on the display unit 206.

<Switching Operation for Applications in Mobile Phone>

Figure 10D:
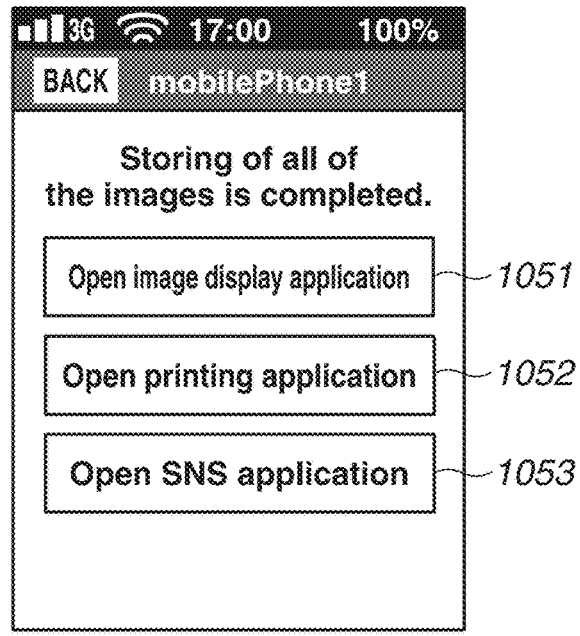

Here, the storing completion screen, illustrated in FIG. 10D, which the control unit 201 displays on the display unit 206 is described. The storing completion screen is used for the purpose of utilizing stored images to switch an application which is operating in the mobile phone 200 from the camera communication application to another application in response to the user's selection operation. The application serving as a switching destination is determined by any one of a button 1051 to a button 1053 being selected by the user. The button 1051 is a button used to select an image display application having the function of displaying an image stored on the mobile phone 200. Moreover, the button 1052 is a button used to select a printing application having the function of printing an image stored on the mobile phone 200. Moreover, the button 1053 is a button used to select a social networking service (SNS) application having the function of sharing an image stored on the mobile phone 200 by SNS. When any one of the button 1051 to the button 1053 is selected, in the mobile phone 200, the selected application is activated and is displayed on the display unit 206, and the camera communication application transfers to the background. Alternatively, in the case of being already activated, the selected application transfers from the background to the foreground.

Here, in the present exemplary embodiment, in a case where any one of the button 1051 to the button 1053 has been selected, in response to such a selection, the control unit 201 is assumed to request the OS to activate a previously determined application in the camera communication application. Moreover, in the present exemplary embodiment, the image display application is assumed to be an application pre-installed on the mobile phone 200 (i.e., assumed to be an application included as standard on the OS of the mobile phone 200). Furthermore, the present exemplary embodiment is not limited to this, and the image display application can be an application which is installed on the mobile phone 200 in response to the operation of the user.

Furthermore, applications which are installed on a mobile phone include many applications having the function of using an external network such as the Internet. If applications are switched while the mobile phone is participating in a network formed by a digital camera, the mobile phone may become unable to use the Internet in an application serving as a switching destination, thus causing inconvenience to the user. If, when switching from the camera communication application to another application, the mobile phone previously pulls out of a network formed by the digital camera, this problem is solved. When the mobile phone pulls out of a network formed by the digital camera, the OS of the mobile phone in the present exemplary embodiment becomes able to use an external network such as the Internet via a public line network such as a 3G lien or a 4G line. Alternatively, when having pulled out of a network formed by the digital camera, the mobile phone becomes able to participate in another external AP located nearby with use of the function of the OS of the mobile phone and to use the Internet.

On the other hand, if the mobile phone pulls out of a network formed by the digital camera at the time of switching of applications, in a case where the camera communication application is intended to be used again, the user's trouble of re-performing a procedure for establishing wireless LAN communication with the digital camera occurs. This is, for example, the following case. In the flow illustrated in FIG. 9A, after storing, in the mobile phone 200, an image stored in the digital camera 100, to confirm that the image has been indeed stored in the mobile phone 200, the user activates the image display application and then confirms the stored image. Then, after confirming that the image has been stored in the mobile phone 200, the user switches the image display application to the camera communication application again, and thus intends to additionally store an image. At this time, if wireless LAN communication is previously cut off at the time of switching to the camera communication application, the user is required to re-perform an operation for establishing wireless LAN communication, which operation may be a load on the user.

Therefore, at the time of switching to another application, in consideration of the possibility of using an external network in an application serving as a switching destination and the trouble of establishing wireless LAN communication, the mobile phone 200 in the present exemplary embodiment varies whether to cut off wireless LAN communication.

In the following description, processing which the mobile phone 200 performs in a case where an instruction for switching from the camera communication application to another application has been issued is described with reference to FIG. 9B. When any one of the button 1051, the button 1052, and the button 1053 has been selected, i.e., when an instruction for switching applications has been issued, the control unit 201 starts the flow illustrated in FIG. 9B.

In step S951, the control unit 201 determines whether a wireless network in which the mobile phone 200 is currently participating is a network formed by the simple AP function of the digital camera 100. If it is determined that a wireless network in which the mobile phone 200 is currently participating is not a network formed by the simple AP function of the digital camera 100 (NO in step S951), the control unit 201 advances the processing to step S952. On the other hand, if it is determined that a wireless network in which the mobile phone 200 is currently participating is a network formed by the simple AP function of the digital camera 100 (YES in step S951), the control unit 201 advances the processing to step S953.

In the present exemplary embodiment, the ESSID of a wireless network which the digital camera 100 forms as a simple AP is an identifier having a prefix "CAMERA-" appended thereto. Therefore, in a case where a prefix "CAMERA-" is included in the ESSID of a wireless network in which the mobile phone 200 is currently participating, the control unit 201 determines that a wireless network in which the mobile phone 200 is currently participating is a network formed by the simple AP function of the digital camera 100. On the other hand, in a case where a prefix "CAMERA-" is not included, the control unit 201 determines that a wireless network in which the mobile phone 200 is currently participating is not a network formed by the simple AP function of the digital camera 100. Furthermore, while, in the present exemplary embodiment, a configuration in which the control unit 201 uses the prefix of the ESSID to determine whether a wireless network in which the mobile phone 200 is currently participating is a network formed by the simple AP function is employed, the present exemplary embodiment is not limited to this configuration. For example, a configuration in which, at the time of establishment of wireless LAN communication, the control unit 201 acquires, from the digital camera 100, information indicating whether the digital camera 100 is operating as a simple AP and then makes the above determination based on the acquired information can be employed. Alternatively, the control unit 201 can check whether a wireless network in which the mobile phone 200 is currently participating is a network available for connecting to the Internet to determine whether the current network is a network formed by the simple AP function. To check whether a wireless network in which the mobile phone 200 is currently participating is a network available for connecting to the Internet, the control unit 201 can determine that the current network is a network formed by the simple AP function by, for example, recognizing that, as a result of trying to access a predetermined server on the Internet, an error notification has been received a predetermined number of times or more.

First, a case where the processing has proceeded from step S951 to step S952 is described. In this case, the control unit 201 determines that a wireless network in which the mobile phone 200 is currently participating is not a network formed by the simple AP function but a network formed by an external AP. Thus, the control unit 201 determines that there is occurring a connection configuration such as that illustrated in FIG. 3A. In this case, even while keeping wireless LAN communication with the digital camera 100 without pulling out of a network in which the mobile phone 200 is currently participating, the mobile phone 200 is able to perform communication using an external network via the external AP 300 with use of an application serving as a switching destination. Therefore, the control unit 201 keeps connecting to a network in which the mobile phone 200 is currently participating.

Next, a case where the processing has proceeded from step S951 to step S953 is described. In this case, the control unit 201 determines that the current connection configuration is that illustrated in FIG. 3B. In this case, while the mobile phone 200 is connecting to a network formed by an AP, since the AP is a simple AP, the mobile phone 200 is not able to use an external network. Therefore, in step S953, the control unit 201 determines whether the selected application performs communication using an external network. If it is determined that the selected application performs communication using an external network (YES in step S953), the control unit 201 advances the processing to step S954. On the other hand, if it is determined that the selected application does not perform communication using an external network (NO in step S953), the control unit 201 advances the processing to step S956.

Here, the mobile phone 200 in the present exemplary embodiment is assumed to previously store, in the non-volatile memory 203, information indicating whether each application performs communication using an external network, and makes a determination using such stored information. In the present exemplary embodiment, information indicating that the image display application does not perform communication using an external network is stored in the non-volatile memory 203. Moreover, information indicating that the printing application and the SNS application perform communication using an external network is stored in the non-volatile memory 203. This is because, as mentioned above, the user of the mobile phone 200 often opens the image display application for the purpose of confirming that an image received from the digital camera 100 is currently stored and, thus, it is supposed that the image display application is less likely to use the Internet. On the other hand, this is because it is supposed that, for example, the printing application connects to a printer apparatus to perform printing of a stored image and is, therefore, likely to use an external network. Moreover, this is because it is supposed that the SNS application is likely to transmit a stored image to an external apparatus via an external network.

As described above, in the present exemplary embodiment, the control unit 201 discriminates whether the selected application is an application requiring an external network based on whether the selected application is an application for image display.

In step S954, the control unit 201 transmits a request for cutting off wireless LAN communication to the digital camera 100.

Next, in step S955, the control unit 201 pulls out of the network in which the mobile phone 200 is currently participating and thus cuts off connection with the AP (here, the digital camera 100). This enables the mobile phone 200 to perform communication with an external network via the public network connection unit 212. Alternatively, this enables the mobile phone 200 to participate in a nearby another external AP with use of the function of the OS of the mobile phone 200 and thus perform communication using an external network. Furthermore, while, in the present exemplary embodiment, participation in another network is configured to be implemented by the function of the OS, a configuration in which an instruction for participation in another network is issued in the camera communication application can be employed.

Furthermore, at this time, the control unit 201 can be configured to display, on the display unit 206, information indicating that the mobile phone 200 has cut off wireless LAN communication with the digital camera 100.

On the other hand, in step S956, the control unit 201 determines whether a connection for wireless LAN communication with the digital camera 100 has been implemented by handover from Bluetooth communication. The control unit 201 makes a determination in the present step by checking the presence or absence of storing of information indicating handover connection which is performed in step S854 illustrated in FIG. 8B. If it is determined that the connection has been implemented by handover (YES in step S956), the control unit 201 advances the processing to step S954. If it is determined that the connection has not been implemented by handover (NO in step S956), i.e., wireless LAN connection has been performed by the flow described with reference to FIG. 6A and FIG. 8A, the control unit 201 advances the processing to step S952.

Here, a case where the processing has proceeded from step S956 to step S954 is described. In this case, the current connection configuration is that illustrated in FIG. 3B, and the mobile phone 200 is thus unable to use an external network (for example, the Internet) via an AP. On the other hand, the mobile phone 200 is in a state in which an application determined to be an application which does not perform communication using an external network is currently selected as a switching destination. Additionally, Bluetooth communication is being kept between the mobile phone 200 and the digital camera 100. Therefore, even after wireless LAN communication is cut off, the mobile phone 200 and the digital camera 100 performing the flows illustrated in FIG. 7 and FIGS. 8A and 8B enable establishing wireless LAN communication without requiring the user's trouble. Moreover, while the image display application is less likely to perform external communication, switching to the printing application or the SNS application via the image display application to use an external network is also conceivable. In a case where it is possible to use handover in which establishment of wireless LAN communication is able to be performed without the user's trouble, the control unit 201 cuts off wireless LAN communication with the digital camera 100 in advance. For example, when, after the camera communication application is switched to the selected application, the selected application has been switched to the camera communication application again by the user and the camera communication application has transferred to the foreground, the control unit 201 performs the flow illustrated in FIGS. 8A and 8B. In this way, if, when the selected application has returned to the camera communication application, handover to wireless LAN communication is automatically performed, since wireless LAN communication is established by the user only performing an operation for returning the selected application to the camera communication application, the user is able to use applications without stress. Furthermore, timing of performing handover from Bluetooth communication to wireless LAN communication is not limited to this. For example, a configuration in which, at timing of determining that the viewing button 1001 has been selected by the user, the control unit 201 performs handover before starting the flow illustrated in FIGS. 9A and 9B.

On the other hand, a case where the processing has proceeded from step S956 to step S952 is described. In this case, the current connection configuration is that illustrated in FIG. 3B, and the mobile phone 200 is thus unable to use an external network via an AP. On the other hand, the mobile phone 200 is in a state in which an application determined to be an application which does not perform communication using an external network is currently selected as a switching destination. Additionally, the flow described with reference to FIGS. 6A and 6B and FIGS. 8A and 8B has been performed to establish wireless LAN communication via the user's operation of, for example, selecting a network. In this case, if wireless LAN communication is cut off, when the user wants to use the camera communication application again, the user's trouble becomes required to establish wireless LAN communication again. Therefore, in this case, the control unit 201 does not cut off but keeps wireless LAN communication.

Finally, in step S957, the control unit 201 requests the OS to activate the selected application. With this operation, in the mobile phone 200, the selected application is activated and then displayed, and the camera communication application transfers to the background.

Thus far is the operation of the mobile phone 200 performed after wireless LAN communication with the digital camera 100 is established.

Next, a detailed operation of the digital camera 100 is described as follows. FIG. 11 is a flowchart illustrating an operation which the digital camera 100 performs after establishing wireless LAN communication with the mobile phone 200.

In step S1101, the control unit 101 of the digital camera 100 determines whether a request from the mobile phone 200 has been received via the connection unit 111. If it is determined that the request has been received (YES in step S1101), the control unit 101 advances the processing to step S1102, and, if it is determined that the request has not been received (NO in step S1101), the control unit 101 repeats processing in step S1101. The request which might be received here is any one of a request for thumbnails which is transmitted in step S902, a request for image data which is transmitted in step S909, and a request for cutting off of wireless LAN communication which is transmitted in step S954.

A case where the processing has proceeded to step S1102 is described. In step S1102, the control unit 101 determines whether the request received in step S1101 is a request for thumbnails (a request which is transmitted in step S902). If it is determined that the received request is a request for thumbnails (YES in step S1102), the control unit 101 advances the processing to step S1103. If it is determined that the received request is not a request for thumbnails (NO in step S1102), the control unit 101 advances the processing to step S1105.

First, a case where the processing has proceeded to step S1103 is described. In step S1103, the control unit 101 searches for image data requested by the mobile phone 200 from among pieces of image data stored in the recording medium 110, and reads a thumbnail corresponding to the found image data into the working memory 104. Naturally, the control unit 101 is able to read a plurality of thumbnails into the working memory 104. At that time, the control unit 101 can use a thumbnail which is previously associated with the found image data or can generate a new thumbnail separately.

Next, in step S1104, the control unit 101 transmits the thumbnail stored in the working memory 104 to the mobile phone 200, from which the request has been received, and then returns the processing to step S1101. As a result of this processing, the mobile phone 200 performs the thumbnail reception processing in step S903. Thus far is the processing for transmitting a thumbnail from the digital camera 100 to the mobile phone 200.

Next, a case where the processing has proceeded to step S1105 is described. In step S1105, the control unit 101 determines whether the request received in step S1101 is a request for image data (i.e., a request which is transmitted in step S909). If it is determined that the received request is a request for image data (YES in step S1105), the control unit 101 advances the processing to step S1106. If it is determined that the received request is not a request for image data (NO in step S1105), the control unit 101 advances the processing to step S1108.

First, a case where the processing has proceeded to step S1106 is described. In step S1106, the control unit 101 searches for image data requested by the mobile phone 200 from among pieces of image data stored in the recording medium 110, and reads the found image data into the working memory 104.

Next, in step S1107, the control unit 101 transmits the image data stored in the working memory 104 to the mobile phone 200, and then returns the processing to step S1101. As a result of this processing, the mobile phone 200 performs the image data reception processing in step S910.

Next, a case where the processing has proceeded to step S1108 is described. In step S1108, the control unit 101 determines whether the request received in step S1101 is a request for cutting off of wireless LAN communication (i.e., a request which is transmitted in step S954). If it is determined that the received request is a request for cutting off of wireless LAN communication (YES in step S1108), the control unit 101 advances the processing to step S1109. If it is determined that the received request is not a request for cutting off of wireless LAN communication (NO in step S1108), the control unit 101 advances the processing to step S1112.

In step S1109, the control unit 101 determines whether the digital camera 100 itself is operating as a simple AP. If it is determined that the digital camera 100 itself is not operating as a simple AP (NO in step S1109), the control unit 101 advances the processing to step S1110. If it is determined that the digital camera 100 itself is operating as a simple AP (YES in step S1109), the control unit 101 advances the processing to step S1111.

In step S1110, the control unit 101 performs processing for pulling out of the network in which the digital camera 100 is participating. On the other hand, in step S1111, the control unit 101 dissolves the network which the digital camera 100 is forming. Specifically, the control unit 101 stops transmission of a beacon signal and broadcasts, to the network, a notification indicating that, for example, the control unit 101 will dissolve the network.

On the other hand, in step S1112, the control unit 101 determines that the received request is a request to which the digital camera 100 is not able to appropriately respond and thus transmits an error notification indicating that effect to the mobile phone 200. Then, the control unit 101 returns the processing to step S1101.

Furthermore, in the present exemplary embodiment, a configuration in which the control unit 201 of the mobile phone 200 transmits a request for cutting-off to the digital camera 100 and, upon receiving the transmitted request, the control unit 101 performs processing for pulling-out or processing for dissolution with respect to a network described in step S1109 to step S1111 has been described. However, the present exemplary embodiment is not limited to this configuration. For example, a configuration in which the mobile phone 200 does not transmit a request for cutting-off in step S954 and, when determining that wireless LAN communication with a connection partner has been cut off, the digital camera 100 performs processing for pulling-out or processing for dissolution with respect to a network described in step S1109 to step S1111 can be employed. For example, the control unit 101 is able to determine that communication with a connection partner has been cut off, for example, in a case where the mobile phone 200 has become not present on the network or in a case where the digital camera 100 itself has become unable to receive a beacon signal from an AP and thus has lost the network. Furthermore, in a case where the digital camera 100 itself is operating as a simple AP, the digital camera 100 never loses the network.

Thus far is the processing in which, in wireless LAN communication, the digital camera 100 transmits an image to the mobile phone 200 and then cuts off wireless LAN communication.

Furthermore, in the present exemplary embodiment, a configuration in which the user operates the mobile phone 200 to issue an instruction to the digital camera 100 to transmit image data to the mobile phone 200 has been described. On the other hand, a configuration in which the user operates the digital camera 100 to transmit image data to the mobile phone 200 can be employed.

Furthermore, while, in the present exemplary embodiment, a configuration in which, in a case where an instruction for switching applications has been issued by the user, the control unit 201 requests the OS to activate an application which is previously determined in the camera communication application has been described, the present exemplary embodiment is not limited to this configuration. For example, a configuration in which, when being instructed to perform switching to an application for displaying an image, the control unit 201 requests the OS to activate an optional application having the function of displaying an image, thus activating the optional application by processing performed by the OS, can be employed. At this time, in the determination performed in step S953, when requesting the OS to activate an application having the function of displaying an image, the control unit 201 determines not to perform communication using an external network. Furthermore, in a case where a plurality of applications each having the function of displaying an image is previously installed on the mobile phone 200, the control unit 201 can be configured to display the installed applications in list form and then activate an application selected by the user.

Furthermore, in the present exemplary embodiment, a configuration in which, when being instructed to switch applications by a user operation performed on the camera communication application, the control unit 201 determines whether the selected application performs communication using an external network has been described. However, the present exemplary embodiment is not limited to this configuration. For example, the control unit 201 can be configured to make such a determination when having detected that, in the mobile phone 200, the camera communication application has been interrupted (i.e., has transferred to the background) and then another application has been activated (i.e., has transferred to the foreground). Moreover, when making such a determination, the control unit 201 can be configured to acquire, via the OS, information about another application activated and determine whether the activated application performs communication using an external network based on the acquired information.

Furthermore, while, in the present exemplary embodiment, Bluetooth is used as a second communication method from which handover to wireless LAN communication is performed, the present exemplary embodiment is not limited to this. For example, Near Field Communication (NFC) can be used as the second communication method. In a case where NFC is used, the digital camera 100 is equipped with a tag for NFC and the control unit 101 previously writes connection information for wireless LAN communication to the tag. Then, in response to the mobile phone 200 being brought close to the digital camera 100, the control unit 201 of the mobile phone 200 reads information written in the tag and then starts the flow illustrated in FIGS. 8A and 8B.

As described above, in the present exemplary embodiment, a configuration in which, when, at the time of reception of an instruction for switching applications, determining that the application serving as a switching destination uses an external network such as the Internet, the mobile phone 200 pulls out of a network in which the mobile phone 200 is currently participating has been described. This configuration enables the mobile phone 200 to use the Internet without inconvenience in the application serving as a switching destination which is considered to use an external network such as the Internet. Moreover, in the present exemplary embodiment, a configuration in which, even when the application serving as a switching destination does not use the Internet, if the mobile phone 200 is participating in a network in response to handover, the mobile phone 200 pulls out of the network in which the mobile phone 200 is participating has been described. This configuration enables the mobile phone 200 to use the Internet in the application serving as a switching destination and a subsequently selected application, and also enables the mobile phone 200 to, even when switching to the camera communication application is performed again, return to connection for wireless LAN communication without the user's trouble.

Moreover, the control unit 201 appropriately switching pulling-out of a network or maintenance of participation in a network enables the user of the mobile phone 200 to perform work such as reception of an image or sharing of an image in the Internet without paying attention to a network in which the mobile phone 200 is currently participating.

OTHER EMBODIMENTS

Various embodiments of the present disclosure can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., computer-readable medium).

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-057794 filed Mar. 27, 2020, which is hereby incorporated by reference herein in its entirety.

What is claimed is:

1. A communication apparatus that is able to participate in a network, the communication apparatus comprising:
 a first communication unit configured to establish communication with a data processing apparatus via the network and perform data communication with the data processing apparatus according to a first communication method;
 a control unit configured to control execution of a plurality of applications including an application for use in communicating with the data processing apparatus;
 a reception unit configured to receive an instruction for switching the application; and
 a determination unit configured to, in a case where the reception unit has received an instruction for switching the application to another application while the first communication unit has established communication with the data processing apparatus according to the first communication method, determine whether the another application indicated as a switching destination by the received instruction for switching the application requires connection to the Internet,
 wherein the control unit controls whether to cut off the established communication, which uses the first communication method, depending on a result of the determination performed by the determination unit.

2. The communication apparatus according to claim 1, wherein, in a case where it is determined by the determination unit that the another application indicated as a switching destination by the received instruction for switching the application requires connection to the Internet, the control unit performs control to cut off the established communication which uses the first communication method.

3. The communication apparatus according to claim 1, further comprising a second communication unit configured to perform data communication with the data processing apparatus according to a second communication method,
 wherein the control unit performs control to establish communication which uses the first communication method according to any one of a plurality of procedures including a first procedure for establishing communication which uses the first communication method based on information communicated to the data processing apparatus in the second communication method and a second procedure for establishing communication which uses the first communication method based on information input by a user operation.

4. The communication apparatus according to claim 3, wherein, in a case where it is determined by the determination unit that the another application indicated as a switching destination by the received instruction for switching the application does not require connection to the Internet, the determination unit determines according to which procedure a communication with the data processing apparatus via the first communication unit, which is being established when the instruction for switching the application has been received, has been established, and
 wherein the control unit controls whether to cut off the communication which uses the first communication method depending on a result of the determination by the determination unit about which procedure the communication with the data processing apparatus via the first communication unit, which is being established when the instruction for switching the application has been received, has been established.

5. The communication apparatus according to claim 4, wherein, in a case where it is determined by the determination unit that the communication with the data processing apparatus via the first communication unit, which is being established when the instruction for switching the application has been received, has been established according to the first procedure, the control unit cuts off communication which uses the first communication method, and wherein, in a case where it is determined by the determination unit that the communication with the data processing apparatus via the first communication unit, which is being established when the instruction for switching the application has been received, has been established according to the second procedure, the control unit does not cut off communication which uses the first communication method.

6. The communication apparatus according to claim 1, wherein, in a case where the another application indicated as a switching destination is an application for displaying an image, the determination unit determines that the another application indicated as a switching destination does not require connection to the Internet.

7. The communication apparatus according to claim 6, wherein the application for displaying an image is an application pre-installed on the communication apparatus.

8. The communication apparatus according to claim 1, wherein, in a case where the network in which the communication apparatus is participating is a network formed by an external access point having a function of connecting to the Internet, even when the communication apparatus has received the instruction for switching the application, the control unit performs control not to cut off communication which uses the first communication method irrespective of a result of the determination by the determination unit.

9. A control method for a communication apparatus that is able to participate in a network, the communication apparatus including a first communication unit configured to establish communication with a data processing apparatus via the network and perform data communication with the data processing apparatus according to a first communication method, the control method comprising:
  controlling execution of a plurality of applications including an application for use in communicating with the data processing apparatus;
  receiving an instruction for switching the application;
  in a case where an instruction for switching the application to another application has been received while the first communication unit has established communication with the data processing apparatus according to the first communication method, determining whether the another application indicated as a switching destination by the received instruction for switching the application requires connection to the Internet; and
  controlling whether to cut off the established communication which uses the first communication method, depending on a result of the determination.

10. A non-transitory computer-readable storage medium storing computer-executable instructions that, when executed by a computer, cause the computer to perform a control method for a communication apparatus that is able to participate in a network, the communication apparatus including a first communication unit configured to establish communication with a data processing apparatus via the network and perform data communication with the data processing apparatus according to a first communication method, the control method comprising:
  controlling execution of a plurality of applications including an application for use in communicating with the data processing apparatus;
  receiving an instruction for switching the application;
  in a case where an instruction for switching the application to another application has been received while the first communication unit has established communication with the data processing apparatus according to the first communication method, determining whether the another application indicated as a switching destination by the received instruction for switching the application requires connection to the Internet; and
  controlling whether to cut off the established communication which uses the first communication method, depending on a result of the determination.

* * * * *